US012783579B2

(12) United States Patent
Sridhar et al.

(10) Patent No.: US 12,783,579 B2
(45) Date of Patent: Nov. 3, 2026

(54) KNOWLEDGE-BASED AUDIO SCENE GRAPH

(71) Applicant: QUALCOMM Incorporated, San Diego, CA (US)

(72) Inventors: Arvind Krishna Sridhar, San Diego, CA (US); Yinyi Guo, San Diego, CA (US); Erik Visser, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 201 days.

(21) Appl. No.: 18/738,243

(22) Filed: Jun. 10, 2024

(65) Prior Publication Data

US 2024/0419731 A1 Dec. 19, 2024

Related U.S. Application Data

(60) Provisional application No. 63/508,199, filed on Jun. 14, 2023.

(51) Int. Cl.
*G06F 16/68* (2019.01)
*G06F 16/638* (2019.01)

(52) U.S. Cl.
CPC .......... *G06F 16/686* (2019.01); *G06F 16/638* (2019.01)

(58) Field of Classification Search
None
See application file for complete search history.

(56) References Cited

U.S. PATENT DOCUMENTS 10,854,192 B1 * 12/2020 Maas ...................... G10L 15/26
11,928,145 B1 * 3/2024 Shi ......................... G06V 10/84
12,374,353 B1 * 7/2025 Ferri ....................... G10L 15/22
2015/0348569 A1 * 12/2015 Allam ..................... G10L 25/27
704/257
2018/0279962 A1 10/2018 Sane et al.
2021/0104255 A1 4/2021 Mitchell et al.
2021/0397980 A1 * 12/2021 Wang ..................... G06N 5/022

FOREIGN PATENT DOCUMENTS

CN 113761267 A 12/2021
CN 114596878 A 6/2022

OTHER PUBLICATIONS

International Search Report and Written Opinion—PCT/US2024/033351—ISA/EPO—Jul. 22, 2024.

* cited by examiner

*Primary Examiner* — Hemant S Patel
(74) *Attorney, Agent, or Firm* — QUALCOMM Incorporated; Espartaco Diaz Hidalgo

(57) ABSTRACT

A device includes a processor configured to obtain a first audio embedding of a first audio segment and obtain a first text embedding of a first tag assigned to the first audio segment. The first audio segment corresponds to a first audio event of audio events. The processor is configured to obtain a first event representation based on a combination of the first audio embedding and the first text embedding. The processor is configured to obtain a second event representation of a second audio event of the audio events. The processor is also configured to determine, based on knowledge data, relations between the audio events. The processor is configured to construct an audio scene graph based on a temporal order of the audio events. The audio scene graph constructed to include a first node corresponding to the first audio event and a second node corresponding to the second audio event.

20 Claims, 22 Drawing Sheets

KNOWLEDGE-BASED AUDIO SCENE GRAPH

I. CROSS-REFERENCE TO RELATED APPLICATIONS

The present disclosure claims priority from Provisional Patent Application No. 63/508,199, filed Jun. 14, 2023, entitled "KNOWLEDGE-BASED AUDIO SCENE GRAPH," the content of which is incorporated herein by reference in its entirety.

II. FIELD

The present disclosure is generally related to knowledge-based audio scene graphs.

III. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Such computing devices often incorporate functionality to receive an audio signal from one or more microphones. For example, the audio signal may represent user speech captured by the microphones, external sounds captured by the microphones, or a combination thereof. Typically, audio analysis can determine a temporal order between sounds in an audio clip. However, sounds can be related in ways in addition to the temporal order. Knowledge regarding such relations can be useful in various types of audio analysis.

IV. SUMMARY

According to one implementation of the present disclosure, a device includes a memory configured to store knowledge data. The device also includes one or more processors coupled to the memory and configured to identify audio segments of audio data corresponding to audio events. The one or more processors are also configured to assign tags to the audio segments. A tag of a particular audio segment describes a corresponding audio event. The one or more processors are further configured to determine, based on the knowledge data, relations between the audio events. The one or more processors are also configured to construct an audio scene graph based on a temporal order of the audio events. The one or more processors are further configured to assign edge weights to the audio scene graph based on a similarity metric and the relations between the audio events.

According to another implementation of the present disclosure, a method includes receiving audio data at a first device. The method also includes identifying, at the first device, audio segments of the audio data that correspond to audio events. The method further includes assigning, at the first device, tags to the audio segments. A tag of a particular audio segment describes a corresponding audio event. The method also includes determining, based on knowledge data, relations between the audio events. The method further includes constructing, at the first device, an audio scene graph based on a temporal order of the audio events. The method also includes assigning, at the first device, edge weights to the audio scene graph based on a similarity metric and the relations between the audio events. The method further includes providing a representation of the audio scene graph to a second device.

According to another implementation of the present disclosure, a non-transitory computer-readable medium stores instructions that, when executed by one or more processors, cause the one or more processors to identify audio segments of audio data corresponding to audio events. The instructions further cause the one or more processors to assign tags to the audio segments. A tag of a particular audio segment describes a corresponding audio event. The instructions also cause the one or more processors to determine, based on knowledge data, relations between the audio events. The instructions further cause the one or more processors to construct an audio scene graph based on a temporal order of the audio events. The instructions also cause the one or more processors to assign edge weights to the audio scene graph based on a similarity metric and the relations between the audio events.

According to another implementation of the present disclosure, an apparatus includes means for identifying audio segments of audio data corresponding to audio events. The apparatus also includes means for assigning tags to the audio segments. A tag of a particular audio segment describes a corresponding audio event. The apparatus further includes means for determining, based on knowledge data, relations between the audio events. The apparatus also includes means for constructing an audio scene graph based on a temporal order of the audio events. The apparatus further includes means for assigning edge weights to the audio scene graph based on a similarity metric and the relations between the audio events.

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
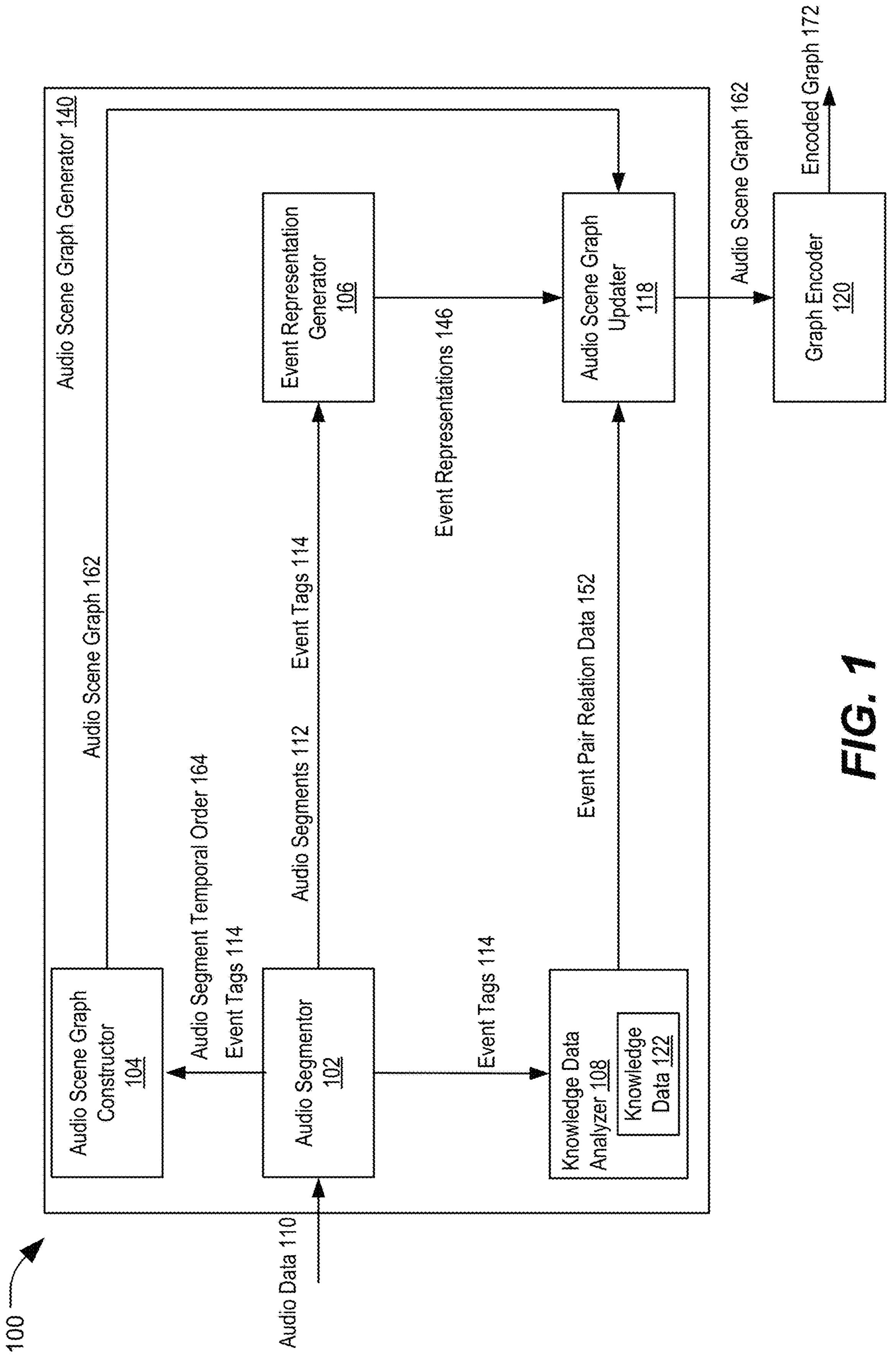
FIG. 1 is a block diagram of a particular illustrative aspect of a system operable to generate a knowledge-based audio scene graph, in accordance with some examples of the present disclosure.

Audio analysis can typically determine a temporal order between sounds in an audio clip. However, sounds can be related in ways in addition to the temporal order. For example, a sound of a door opening may be related to a sound of a baby crying. To illustrate, if the sound of the door opening is earlier than the sound of the baby crying, the opening door might have startled the baby. Alternatively, if the sound of the door opening is subsequent to the sound of the baby crying, somebody might have opened the door to enter a room where the baby is crying or opened the door to take the baby out of the room. Knowledge regarding such relations can be useful in various types of audio analysis. For example, an audio scene representation that indicates that the sound of the baby crying is likely related to an earlier sound of the door opening can be used to respond to a query of "why is the baby crying" with an answer of "the door opened." As another example, an audio scene representation that indicates that the sound of the baby crying is likely related to a subsequent sound of the door opening can be used to respond to a query of "why did the door open" with an answer of "a baby was crying."

Audio applications typically take an audio clip as input and encode a representation of the audio clip using convolutional neural network (CNN) architectures to derive an overall encoded audio representation. The overall encoded audio representation encodes all the audio events of the audio clip into a single vector in a latent space. According to some examples described herein, audio clips are encoded with infused commonsense knowledge graph to enrich the encoded audio representations with information describing relations between the audio events captured in the audio clip. As a first step, an audio segmentation model is used to segment the audio clip into audio events and an audio tagger is used to tag the audio segments. The audio tags are provided as input to the commonsense knowledge graph to retrieve relations between the audio events. The relation information enables construction of an audio scene graph. According to some examples described herein, an audio graph transformer takes into account multiplicity and directionality of edges for encoding audio representations. The audio scene graph is encoded using the audio graph transformer based encoder. A model performance can be tested on downstream tasks. In some implementations, the model (e.g., the audio segmentation model, the knowledge graph, the audio graph transformer, or a combination thereof) can be updated based on performance on (e.g., a loss function related to) downstream tasks.

Systems and methods of generating knowledge-based audio scene graphs are disclosed. For example, an audio scene graph generator identifies and tags audio segments corresponding to audio events. To illustrate, a first audio event is detected in a first audio segment, a second audio event is detected in a second audio segment, and a third audio event is detected in a third audio segment. The first audio segment, the second audio segment, and the third audio segment are assigned a first tag associated with the first audio event, a second tag associated with the second audio event, a third tag associated with the third audio event, respectively.

The audio scene graph generator constructs an audio scene graph based on a temporal order of the audio events. For example, the audio scene graph includes a first node, a second node, and a third node corresponding to the first audio event, the second audio event, and the third audio event, respectively. The audio scene graph generator, in an initial audio scene graph construction phase, adds edges between nodes that are temporally next to each other. For example, the audio scene graph generator, based on determining that the second audio event is temporally next to the first audio event, adds a first edge connecting the first node to the second node. Similarly, the audio scene graph generator, based on determining that the third audio event is temporally next to the second audio event, adds a second edge connecting the second node to the third node. The audio scene graph generator, based on determining that the third audio event is not temporally next to the first audio event, refrains from adding an edge between the first node and the third node.

The audio scene graph generator generates event representations of the audio events. The audio scene graph generator generates a first event representation of the first audio event, a second event representation of the second audio event, and a third event representation of the third audio event. In an example, an event representation of an audio event is based on a tag and an audio segment associated with the audio event.

During a second audio scene graph construction phase, the audio scene graph generator updates the audio scene graph based on knowledge data that indicates relations between audio events. In some examples, the knowledge data is based on human knowledge of relations between various types of events. To illustrate, the knowledge data indicates a relation between the first audio event and the second audio event based on human input acquired during some prior knowledge data generation process indicating that events like the first audio event can be related to events like the second audio event. In some examples, the knowledge data is generated by processing a large number of documents scraped from the internet.

In an example, the audio scene graph generator assigns an edge weight to an existing edge between nodes based on the knowledge data. To illustrate, the knowledge data indicates that the first audio event (e.g., the sound of a door opening) is related to the second audio event (e.g., the sound of a baby crying). The audio scene graph generator, in response to determining that the first audio event and the second audio event are related, determines an edge weight based at least in part on a similarity metric associated with the first event representation and the second event representation. The audio scene graph generator assigns the edge weight to an edge between the first node and the second node in the audio scene graph. In a particular aspect, the edge weight indicates a strength (e.g., a likelihood) of the relation between the first audio event and the second audio event. In an example, an edge weight closer to 1 indicates that the first audio event is strongly related to the second audio event, whereas an edge weight closer to 0 indicates that the first audio event is weakly related to the second audio event.

In an example, the audio scene graph generator adds an edge between nodes based on the knowledge data. For example, the audio scene graph generator, in response to determining that the knowledge data indicates that the first audio event and the third audio event are related and that the audio scene graph does not include any edge between the first node and the third node, adds an edge between the first node and the third node. The audio scene graph generator, in response to determining that the first audio event and the third audio event are related, determines an edge weight based at least in part on a similarity metric associated with the first event representation and the third event representation. The audio scene graph generator assigns the edge weight to the edge between the first node and the third node in the audio scene graph. Assigning the edge weights thus adds knowledge-based information in the audio scene graph. The audio scene graph can be used to perform various downstream tasks, such as answering queries.

Figure 13:
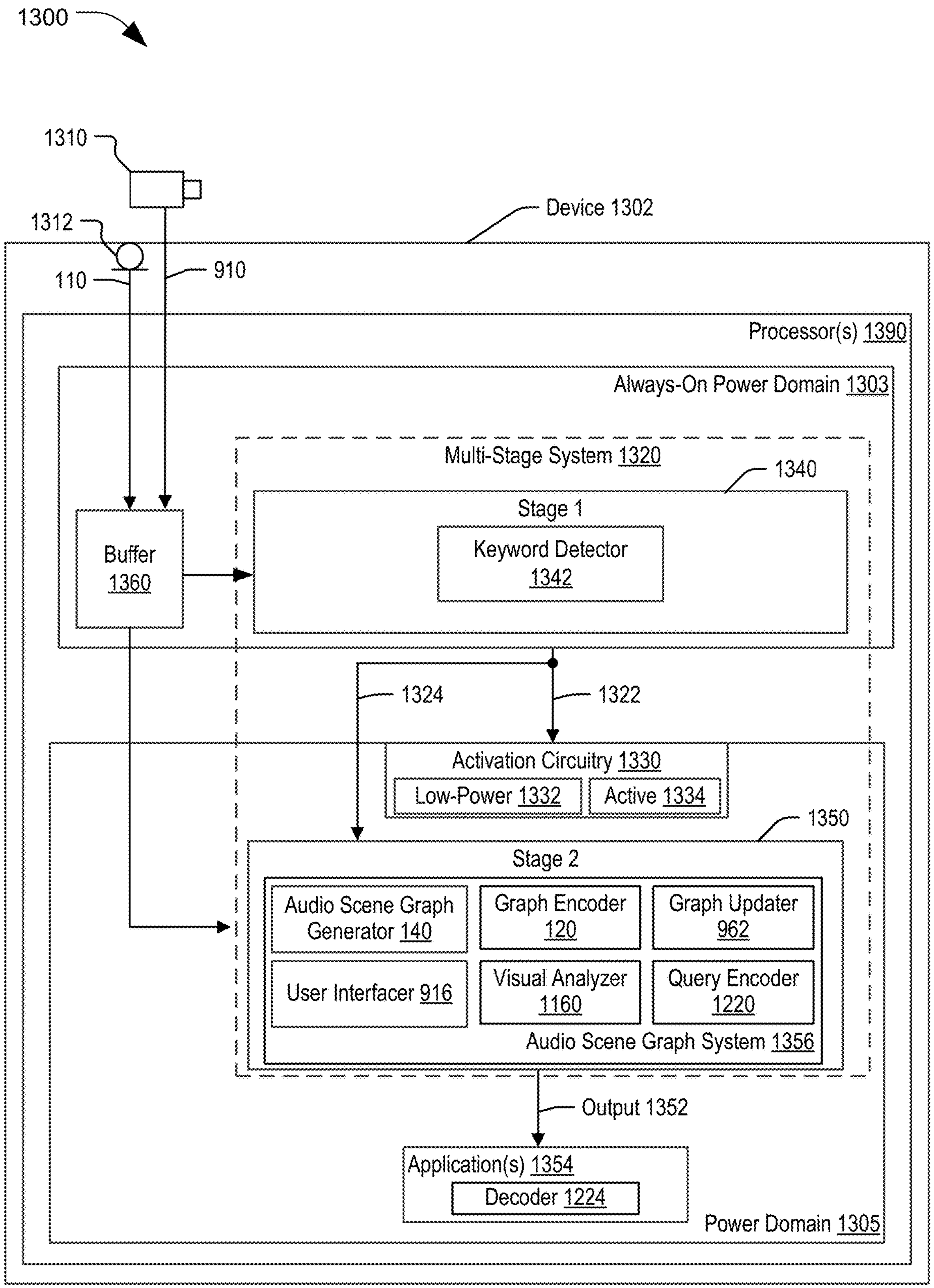
FIG. 13 is a block diagram of an illustrative aspect of a system operable to generate a knowledge-based audio scene graph, in accordance with some examples of the present disclosure.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 13 depicts a device 1302 including one or more processors ("processor(s)" 1390 of FIG. 13), which indicates that in some implementations the device 1302 includes a single processor 1390 and in other implementations the device 1302 includes multiple processors 1390. For ease of reference herein, such features are generally introduced as "one or more" features and are subsequently referred to in the singular or optional plural (as indicated by "(s)") unless aspects related to multiple of the features are being described.

In some drawings, multiple instances of a particular type of feature are used. Although these features are physically and/or logically distinct, the same reference number is used for each, and the different instances are distinguished by addition of a letter to the reference number. When the features as a group or a type are referred to herein e.g., when no particular one of the features is being referenced, the reference number is used without a distinguishing letter. However, when one particular feature of multiple features of the same type is referred to herein, the reference number is used with the distinguishing letter. For example, referring to FIG. 2, multiple audio segments are illustrated and associated with reference numbers 112A, 112B, 112C, 112D, and 112E. When referring to a particular one of these audio segments, such as an audio segment 112A, the distinguishing letter "A" is used. However, when referring to any arbitrary one of these audio segments or to these audio segments as a group, the reference number 112 is used without a distinguishing letter.

As used herein, the terms "comprise," "comprises," and "comprising" may be used interchangeably with "include," "includes," or "including." Additionally, the term "wherein" may be used interchangeably with "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

Referring to FIG. 1, a particular illustrative aspect of a system configured to generate a knowledge-based audio scene graph is disclosed and generally designated 100. The system 100 includes an audio scene graph generator 140 that is configured to process audio data 110 based on knowledge data 122 to generate an audio scene graph 162. According to some implementations, the audio scene graph generator 140 is coupled to a graph encoder 120 that is configured to encode the audio scene graph 162 to generate an encoded graph 172.

The audio scene graph generator 140 includes an audio scene segmentor 102 that is configured to determine audio segments 112 of audio data 110 that correspond to audio events. In particular implementations, the audio scene segmentor 102 includes an audio segmentation model (e.g., a machine learning model). The audio scene segmentor 102 (e.g., includes an audio tagger that) is configured to assign event tags 114 to the audio segments 112 that describe corresponding audio events. The audio scene segmentor 102 is coupled via an audio scene graph constructor 104, an event representation generator 106, and a knowledge data analyzer 108 to an audio scene graph updater 118. The audio scene graph constructor 104 is configured to generate an audio scene graph 162 based on a temporal order of the audio events detected by the audio scene segmentor 102. The event representation generator 106 is configured to generate event representations 146 of the detected audio events based on corresponding audio segments 112 and corresponding event tags 114. The knowledge data analyzer 108 is configured to generate, based on the knowledge data 122, event pair relation data 152 indicating any relations between pairs of the audio events. The audio scene graph updater 118 is configured to assign edge weights to edges between nodes of the audio scene graph 162 based on the event representations 146 and the event pair relation data 152.

In some implementations, the audio scene graph generator 140 corresponds to or is included in one of various types of devices. In an illustrative example, the audio scene graph generator 140 is integrated in a headset device, such as described further with reference to FIG. 16. In other examples, the audio scene graph generator 140 is integrated in at least one of a mobile phone or a tablet computer device, as described with reference to FIG. 15, a wearable electronic device, as described with reference to FIG. 17, a voice-controlled speaker system, as described with reference to FIG. 18, a camera device, as described with reference to FIG. 19, or a virtual reality, mixed reality, or augmented reality headset, as described with reference to FIG. 20. In another illustrative example, the audio scene graph generator 140 is integrated into a vehicle, such as described further with reference to FIG. 21 and FIG. 22.

During operation, the audio scene graph generator 140 obtains the audio data 110. In some examples, the audio data 110 corresponds to an audio stream received from a network device. In some examples, the audio data 110 corresponds to an audio signal received from one or more microphones. In some examples, the audio data 110 is retrieved from a storage device. In some examples, the audio data 110 is obtained from an audio generation application. In some examples, the audio scene graph generator 140 processes the audio data 110 as portions of the audio data 110 are being received (e.g., real-time processing). In some examples, the audio scene graph generator 140 has access to all portions of the audio data 110 prior to initiating processing of the audio data 110 (e.g., offline processing).

The audio scene segmentor 102 identifies the audio segments 112 of the audio data 110 that correspond to audio events and assigns event tags 114 to the audio segments 112, as further described with reference to FIG. 2. An event tag 114 of a particular audio segment 112 describes a corresponding audio event. To illustrate, the audio scene segmentor 102 identifies an audio segment 112 of the audio data 110 as corresponding to an audio event. The audio scene segmentor 102 assigns, to the audio segment 112, an event tag 114 that describes (e.g., identifies) the audio event.

In a particular implementation, the knowledge data 122 indicates relations between pairs of event tags 114 to indicate existence of the relations between a corresponding pair of audio events. In some implementations, the audio scene segmentor 102 is configured to identify audio segments 112 corresponding to audio events that are associated with a set of event tags 114 that are included in the knowledge data 122. The audio scene segmentor 102, in response to identifying an audio segment 112 as corresponding to an audio event associated with a particular event tag 114 of the set of event tags 114, assigns the particular event tag 114 to the audio segment 112.

The audio scene segmentor 102 generates data indicating an audio segment temporal order 164 of the audio segments 112, as further described with reference to FIG. 2. For example, the audio segment temporal order 164 indicates that a first audio segment 112 corresponds to a first playback time associated with a first audio frame to a second playback time associated with a second audio frame, that a second audio segment 112 corresponds to a third playback time associated with a third audio frame to a fourth playback time associated with a fourth audio frame, and so on.

The audio scene graph constructor 104 performs an initial audio scene graph construction phase. For example, the audio scene graph constructor 104 constructs an audio scene graph 162 based on the audio segment temporal order 164, as further described with reference to FIG. 3. To illustrate, the audio scene graph constructor 104 adds nodes to the audio scene graph 162 corresponding to the audio events, and adds edges between pairs of nodes that are indicated by the audio segment temporal order 164 as temporally next to each other. The audio scene graph constructor 104 provides the audio scene graph 162 to the audio scene graph updater 118.

The audio scene graph constructor 104 generates event representations 146 of the audio events based on the audio segments 112 and the event tags 114, as further described with reference to FIG. 4. In an example, an audio segment 112 is identified as associated with an audio event that is described by an event tag 114. The audio scene graph constructor 104 generates an event representation 146 of the audio event based on the audio segment 112 and the event tag 114. The audio scene graph constructor 104 provides the event representations 146 to the audio scene graph updater 118.

The knowledge data analyzer 108 determines, based on the knowledge data 122, relations between the audio events, as further described with reference to FIGS. 5A and 6A. In an example, the knowledge data analyzer 108 generates, based on the knowledge data 122, event pair relation data 152 indicating relations between the audio events corresponding to the event tags 114. To illustrate, the knowledge data analyzer 108, for each particular event tag 114, determines whether the knowledge data 122 indicates one or more relations between the particular event tag 114 and the remaining of the event tags 114. The knowledge data analyzer 108, in response to determining that the knowledge data 122 indicates one or more relations between a first event tag 114 (corresponding to a first audio event) and a second event tag 114 (corresponding to a second audio event), generates the event pair relation data 152 indicating the one or more relations between the first event tag 114 (e.g., the first audio event) and the second event tag 114 (e.g., the second audio event). The knowledge data analyzer 108 provides the event pair relation data 152 to the audio scene graph updater 118.

The audio scene graph updater 118 performs a second audio scene graph construction phase. For example, the audio scene graph updater 118 obtains data generated during the initial audio scene graph construction phase, and uses the data to perform the second audio scene graph construction phase. In some implementations, the initial audio scene graph construction phase can be performed at a first device that provides the data to a second device, and the second device performs the second audio scene graph construction phase.

During the second audio scene graph construction phase, the audio scene graph updater 118 can selectively add one or more edges to the audio scene graph 162 based on the relations indicated by the event pair relation data 152, as further described with reference to FIGS. 5B and 6B. For example, the audio scene graph updater 118, in response to determining that the event pair relation data 152 indicates at least one relation between a first audio event and a second audio event and that the audio scene graph 162 does not include any edge between a first node corresponding to the first audio event and a second node corresponding to the second audio event, adds an edge between the first node and the second node.

During the second audio scene graph construction phase, the audio scene graph updater 118 also assigns edge weights to the audio scene graph 162 based on a similarity metric associated with the event representations 146 and the relations indicated by the event pair relation data 152, as further described with reference to FIGS. 5B and 6B. In a first example, the event pair relation data 152 indicates a single relation between the first audio event (e.g., the first event tag 114) and the second audio event (e.g., the second event tag 114), as described with reference to FIG. 5A. In the first example, the audio scene graph updater 118 determines a first edge weight based on an event similarity metric associated with a first event representation 146 of the first audio event and a second event representation 146 of the second audio event, as further described with reference to FIG. 5B. The audio scene graph updater 118 assigns the first edge to an edge between the first node and the second node of the audio scene graph 162.

In a second example, the event pair relation data 152 indicates multiple relations between the first audio event and the second audio event, and each of the multiple relations has an associated relation tag, as further described with reference to FIG. 6A. In the second example, the audio scene graph updater 118 determines edge weights based on the event similarity metric and relation similarity metrics associated with the relations (e.g., the relation tags). The audio scene graph updater 118 assigns the edge weights to edges between the first node and the second node. Each of the edges corresponds to a respective one of the relations. Assigning the edge weights to the audio scene graph 162 adds information regarding relation strengths to the audio scene graph 162 that are determined based on the relations indicated by the knowledge data 122.

According to some implementations, the audio scene graph 162 provides the audio scene graph 162 to the graph encoder 120. The graph encoder 120 encodes the audio scene graph 162 to generate an encoded graph 172, as further described with reference to FIGS. 7-8. In a particular aspect, the encoded graph 172 retains the directionality information of the edges of the audio scene graph 162.

According to some implementations, a graph updater is configured to update the audio scene graph 162 based on various inputs. In an example, the graph updater updates the audio scene graph 162 based on user feedback (as further described with reference to FIGS. 9-10), an analysis of visual data (as further described with reference to FIG. 11), a performance of one or more downstream tasks, or a combination thereof.

According to some implementations, the audio scene graph 162 or the encoded graph 172 is used to perform one or more downstream tasks. For example, the audio scene graph 162 or the encoded graph 172 can be used to generate responses to queries, as further described with reference to FIG. 12. As another example, the audio scene graph 162 (or the encoded graph 172) can be used to initiate one or more actions. To illustrate, a baby care application can activate a baby wipe warmer in response to determining that the audio scene graph 162 (or the encoded graph 172) indicates a greater than threshold edge weight of a relation (e.g., someone entering a room to change a diaper) between a detected sound of a baby crying and a detected sound of a door opening. In a particular implementation, the graph updater updates the audio scene graph 162 based on performance of (e.g., a loss function related to) one or more downstream tasks.

A technical advantage of the audio scene graph generator 140 includes generation of a knowledge-based audio scene graph 162. The audio scene graph 162 can be used to perform various types of analysis of an audio scene represented by the audio scene graph 162. For example, the audio scene graph 162 can be used to generate responses to queries, initiate one or more actions, or a combination thereof.

Although the audio scene segmentor 102, the audio scene graph constructor 104, the event representation generator 106, the knowledge data analyzer 108, the audio scene graph updater 118, and the graph encoder 120 are described as separate components, in some examples two or more of the audio scene segmentor 102, the audio scene graph constructor 104, the event representation generator 106, the knowledge data analyzer 108, the audio scene graph updater 118, and the graph encoder 120 can be combined into a single component.

In some implementations, the audio scene graph generator 140 and the graph encoder 120 can be integrated into a single device. In other implementations, the audio scene graph generator 140 can be integrated into a first device and the graph encoder 120 can be integrated into a second device.

Figure 2:
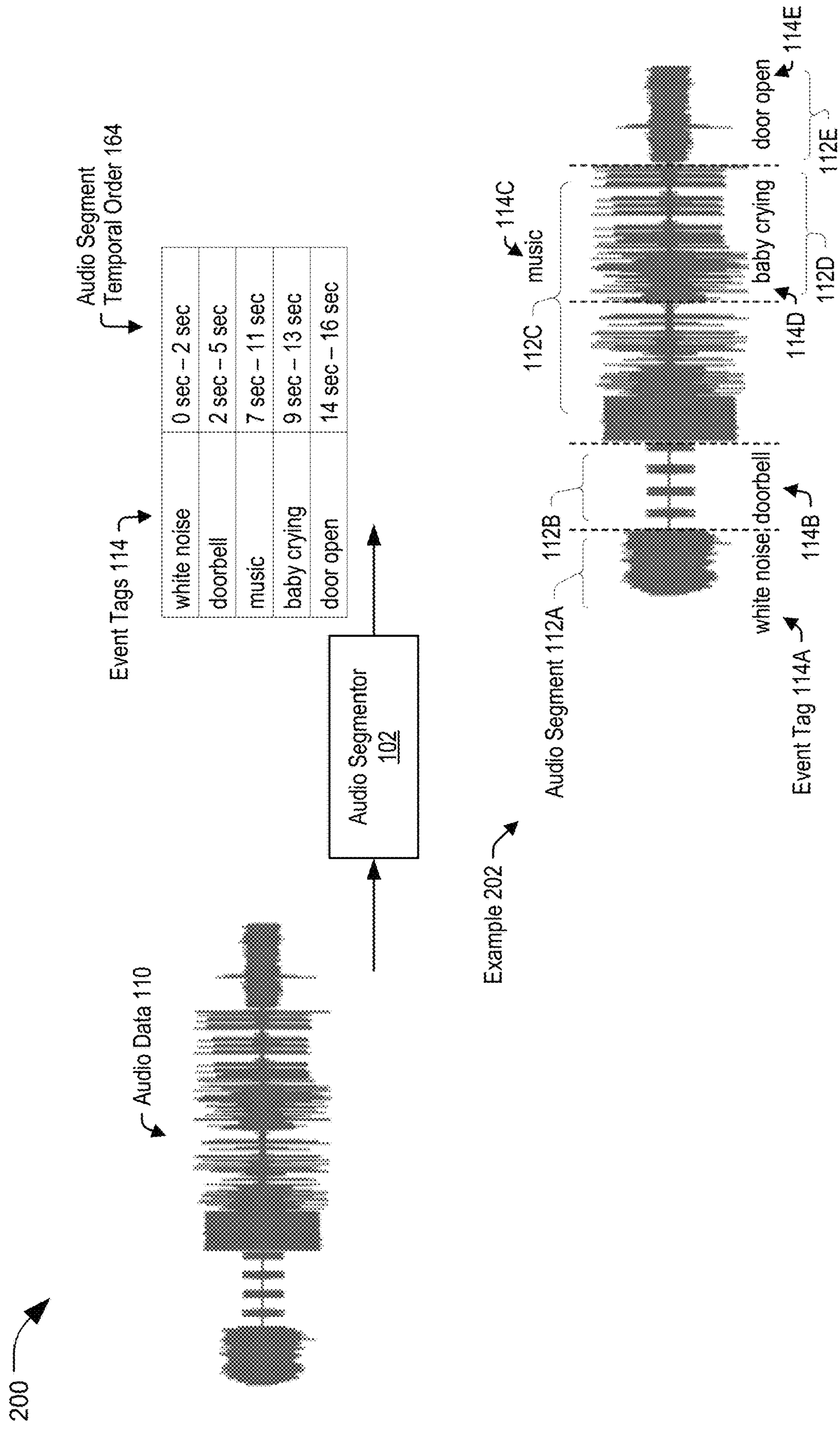
FIG. 2 is a diagram of an illustrative aspect of operations associated with an audio segmentor of the system of FIG. 1, in accordance with some examples of the present disclosure.

FIG. 2 is a diagram 200 of an illustrative aspect of operations associated with the audio scene segmentor 102, in accordance with some examples of the present disclosure. The audio scene segmentor 102 obtains the audio data 110, as described with reference to FIG. 1.

The audio scene segmentor 102 performs audio event detection on the audio data 110 to identify audio segments 112 corresponding to audio events and assigns corresponding tags to the audio segments 11. In an example 202, the audio scene segmentor 102 identifies an audio segment 112A (e.g., sound of white noise) extending from a first playback time (e.g., 0 seconds) to a second playback time (e.g., 2 seconds) as associated with a first audio event (e.g., white noise). The audio scene segmentor 102 assigns an event tag 114A (e.g., "white noise") describing the first audio event to the audio segment 112A. Similarly, the audio scene segmentor 102 assigns an event tag 114B (e.g., "doorbell"), an event tag 114C (e.g., "music"), an event tag 114D (e.g., "baby crying"), and an event tag 114E (e.g., "door open") to an audio segment 112B (e.g., sound of a doorbell), an audio segment 112C (e.g., sound of music), an audio segment 112D (e.g., sound of a baby crying), and an audio segment 112E (e.g., sound of a door opening), respectively. It should be understood that the audio segments 112 including 5 audio segments is provided as an illustrative example, in other examples the audio segments 112 can include fewer than 5 or more than 5 audio segments.

The audio scene segmentor 102 generates data indicating an audio segment temporal order 164 of the audio segments 112. For example, the audio segment temporal order 164 indicates that the audio segment 112A (e.g., sound of white noise) is identified as extending from the first playback time (e.g., 0 seconds) to the second playback time (e.g., 2 seconds). Similarly, the audio segment temporal order 164 indicates that the audio segment 112B (e.g., sound of a doorbell) is identified as extending from the second playback time (e.g., 2 seconds) to the third playback time (e.g., 5 seconds).

In some examples, there can be a gap between consecutively identified audio segments 112. To illustrate, the audio segment temporal order 164 indicates that the audio segment 112C (e.g., music) is identified as extending from a fourth playback time (e.g., 7 seconds) to a fifth playback time (e.g., 11 seconds). A gap between the third playback time (e.g., 5 seconds) and the fourth playback time (e.g., 7 seconds) can correspond to silence or unidentifiable sounds between the audio segment 112B (e.g., the sound of a doorbell) and the audio segment 112C (e.g., the sound of music).

In some examples, an audio segment 112 can overlap one or more other audio segments 112. For example, the audio segment temporal order 164 indicates that the audio segment 112D is identified as extending from a sixth playback time (e.g., 9 seconds) to a seventh playback time (e.g., 13 seconds). The sixth playback time is between the fourth playback time and the fifth playback time, and the seventh playback time is subsequent to the fourth playback time indicating that the audio segment 112D (e.g., the sound of the baby crying) at least partially overlaps the audio segment 112C (e.g., the sound of music).

Figure 3:
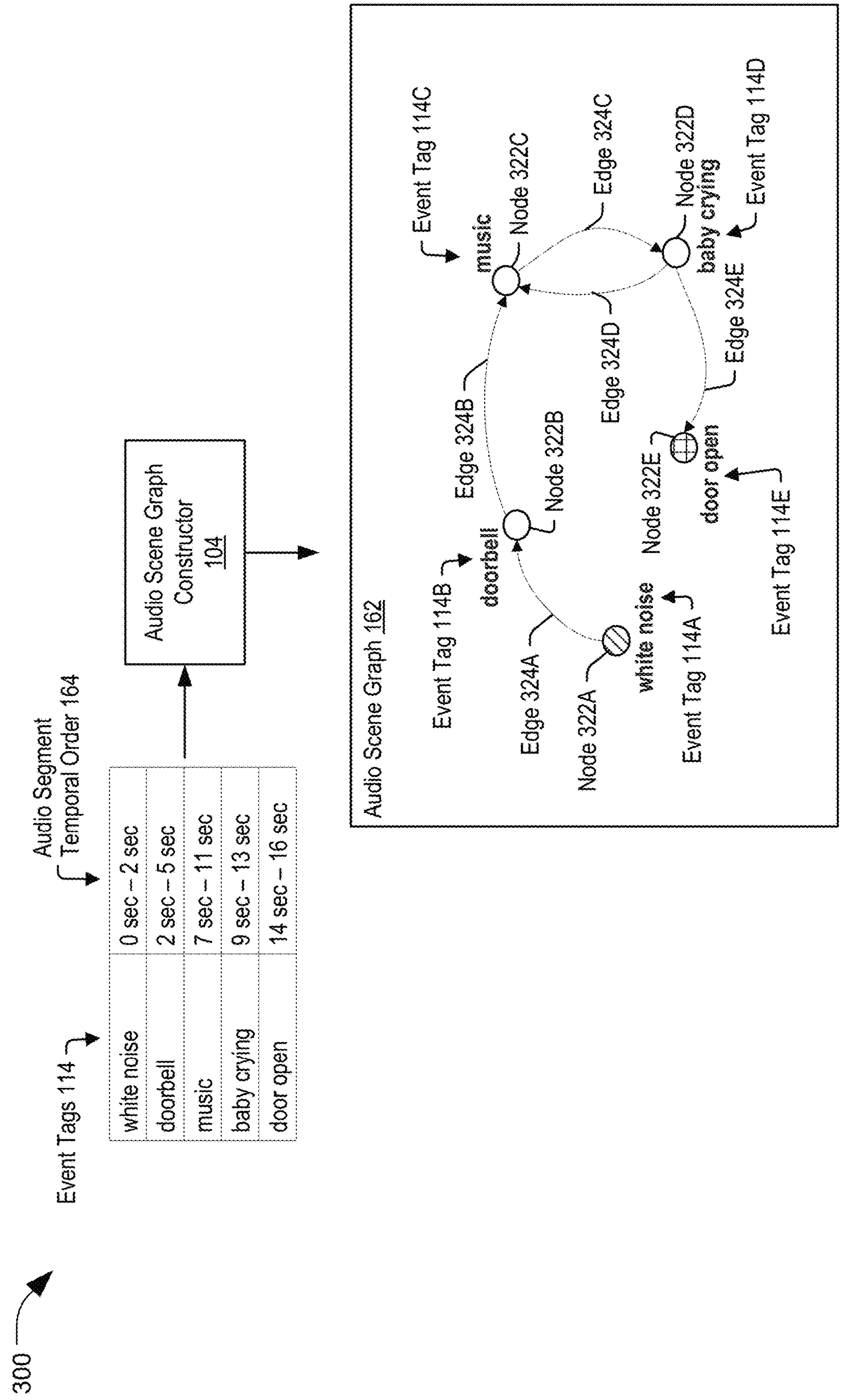
FIG. 3 is a diagram of an illustrative aspect of operations associated with an audio scene graph constructor of the system of FIG. 1, in accordance with some examples of the present disclosure.

FIG. 3 is a diagram 300 of an illustrative aspect of operations associated with the audio scene graph constructor 104, in accordance with some examples of the present disclosure. The audio scene graph constructor 104 is configured to construct the audio scene graph 162 based on the audio segment temporal order 164 of the audio segments 112 and the event tags 114 assigned to the audio segments 112.

The audio scene graph constructor 104 adds nodes 322 to the audio scene graph 162. The nodes 322 correspond to the audio events associated with the event tags 114. For example, the audio scene graph constructor 104 adds, to the audio scene graph 162, a node 322A corresponding to an audio event associated with the event tag 114A. Similarly, the audio scene graph constructor 104 adds, to the audio scene graph 162, a node 322B, a node 322C, a node 322D, and a node 322E corresponding to the event tag 114B, the event tag 114C, the event tag 114D, and the event tag 114E, respectively.

The node 322A is associated with the audio segment 112A that is assigned the event tag 114A. Similarly, the node 322B, the node 322C, the node 322D, and the node 322E are associated with the audio segment 112B, the audio segment 112C, the audio segment 112D, and the audio segment 112E, respectively.

The audio scene graph constructor 104 adds edges 324 between pairs of the nodes 322 associated with the event tags 114 that are temporally next to each other in the audio segment temporal order 164. For example, the audio scene graph constructor 104, in response to determining that the node 322A is associated with the audio segment 112A that extends from a first playback time (e.g., 0 seconds) to a second playback time (e.g., 2 seconds), identifies a temporally next audio segment that either overlaps the audio segment 112A or has a start playback time that is closest to the second playback time among audio segment start playback times that are greater than or equal to the second playback time. To illustrate, the audio scene graph constructor 104 identifies the audio segment 112B extending from the second playback time (e.g., 2 seconds) to a third playback time (e.g., 5 seconds) as a temporally next audio segment to the audio segment 112A. The audio scene graph constructor 104, in response to determining that the audio segment 112B is temporally next to the audio segment 112A, adds an edge 324A from the node 322A associated with the audio segment 112A to the node 322B associated with the audio segment 112B.

Similarly, the audio scene graph constructor 104, in response to determining that the audio segment 112C is associated with a start playback time (e.g., 7 seconds) that is closest to the third playback time (e.g., 5 seconds) among audio segment start playback times that are greater than or equal to the third playback time, identifies the audio segment 112C as a temporally next audio segment to the audio segment 112B. The audio scene graph constructor 104, in response to determining that the audio segment 112C is temporally next to the audio segment 112B, adds an edge 324B from the node 322B associated with the audio segment 112B to the node 322C associated with the audio segment 112C.

The audio scene graph constructor 104, in response to determining that the audio segment 112D at least partially overlaps the audio segment 112C, determines that the audio segment 112D is temporally next to the audio segment 112C. The audio scene graph constructor 104, in response to determining that the audio segment 112D at least partially overlaps the audio segment 112C, adds an edge 324C from the node 322C (associated with the audio segment 112C) to the node 322D (associated with the audio segment 112D) and adds an edge 324D from the node 322D to the node 322C.

The audio scene graph constructor 104 continues to add edges 324 to the audio scene graph 162 in this manner until an end node is reached. For example, the audio scene graph constructor 104, in response to determining that the audio segment 112E is associated with a start playback time (e.g., 14 seconds) that is closest to an end playback time (e.g., 13 seconds) of the audio segment 112D among audio segment start playback times that are greater than or equal to the end playback time, determines that the audio segment 112E is temporally next to the audio segment 112D. The audio scene graph constructor 104, in response to determining that the audio segment 112E is temporally next to the audio segment 112D, adds an edge 324E from the node 322D associated with the audio segment 112D to the node 322E associated with the audio segment 112E.

The audio scene graph constructor 104 determines that construction of the audio scene graph 162 is complete based on determining that the node 322E corresponds to a last audio segment 112 in the audio segment temporal order 164. In a particular aspect, the audio scene graph constructor 104, in response to determining that the audio segment 112E has the greatest start playback time among the audio segments 112, determines that the audio segment 112E corresponds to the last audio segment 112.

Figure 4:
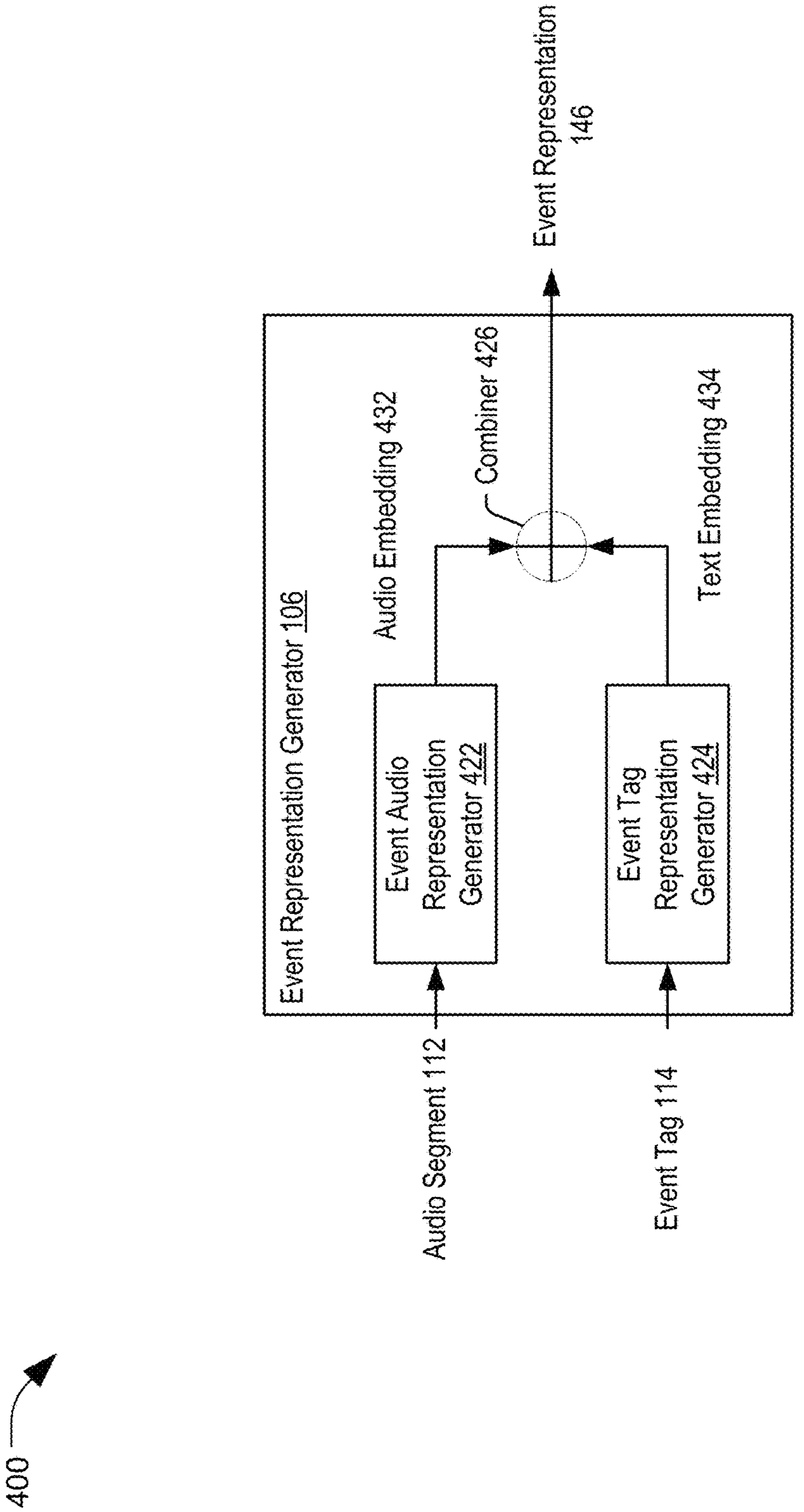
FIG. 4 is a diagram of an illustrative aspect of operations associated with an event representation generator of the system of FIG. 1, in accordance with some examples of the present disclosure.

FIG. 4 is a diagram 400 of an illustrative aspect of operations associated with the event representation generator 106, in accordance with some examples of the present disclosure. The event representation generator 106 is configured to generate an event representation 146 of an audio event detected in an audio segment 112 that is assigned an event tag 114. The event representation generator 106 includes a combiner 426 coupled to an event audio representation generator 422 and to an event tag representation generator 424.

The event audio representation generator 422 is configured to process an audio segment 112 to generate an audio embedding 432 representing the audio segment 112. The audio embedding 432 can correspond to a lower-dimensional representation of the audio segment 112. In an example, the audio embedding 432 includes an audio feature vector including feature values of audio features. The audio features can include spectral information, such as frequency content over time, as well as statistical properties such as mel-frequency cepstral coefficients (MFCCs). In some implementations, the event audio representation generator 422 includes a machine learning model (e.g., a deep neural network) that is trained on labeled audio data to generate audio embeddings. According to some implementations, the event audio representation generator 422 pre-processes the audio segment 112 prior to generating the audio embedding 432. The pre-processing can include resampling, normalization, filtering, or a combination thereof.

The event tag representation generator 424 is configured to process an event tag 114 to generate a text embedding 434 representing the event tag 114. The text embedding 434 can correspond to a numerical representation that captures the semantic meaning and contextual information of the event tag 114. In an example, the text embedding 434 includes a text feature vector including feature values of text features. In some implementations, the event tag representation generator 424 includes a machine learning model (e.g., a deep neural network) that is trained on labeled text to generate text embeddings. According to some implementations, the event tag representation generator 424 pre-processes the event tag 114 prior to generating the text embedding 434. The pre-processing can include converting text to lowercase, removing punctuation, handling special characters, tokenizing the event tag 114 into individual words or subword units, or a combination thereof.

The combiner 426 is configured to combine (e.g., concatenate) the audio embedding 432 and the text embedding 434 to generate an event representation 146 of the audio event detected in the audio segment 112 and described by the event tag 114. In an example, the event representation generator 106 thus generates a first event representation 146 corresponding to the audio segment 112A and the event tag 114A, a second event representation 146 corresponding to the audio segment 112B and the event tag 114B, a third event representation 146 corresponding to the audio segment 112C and the event tag 114C, a fourth event representation 146 corresponding to the audio segment 112D and the event tag 114D, a fifth event representation 146 corresponding to the audio segment 112E and the event tag 114E, etc.

Figure 5A:
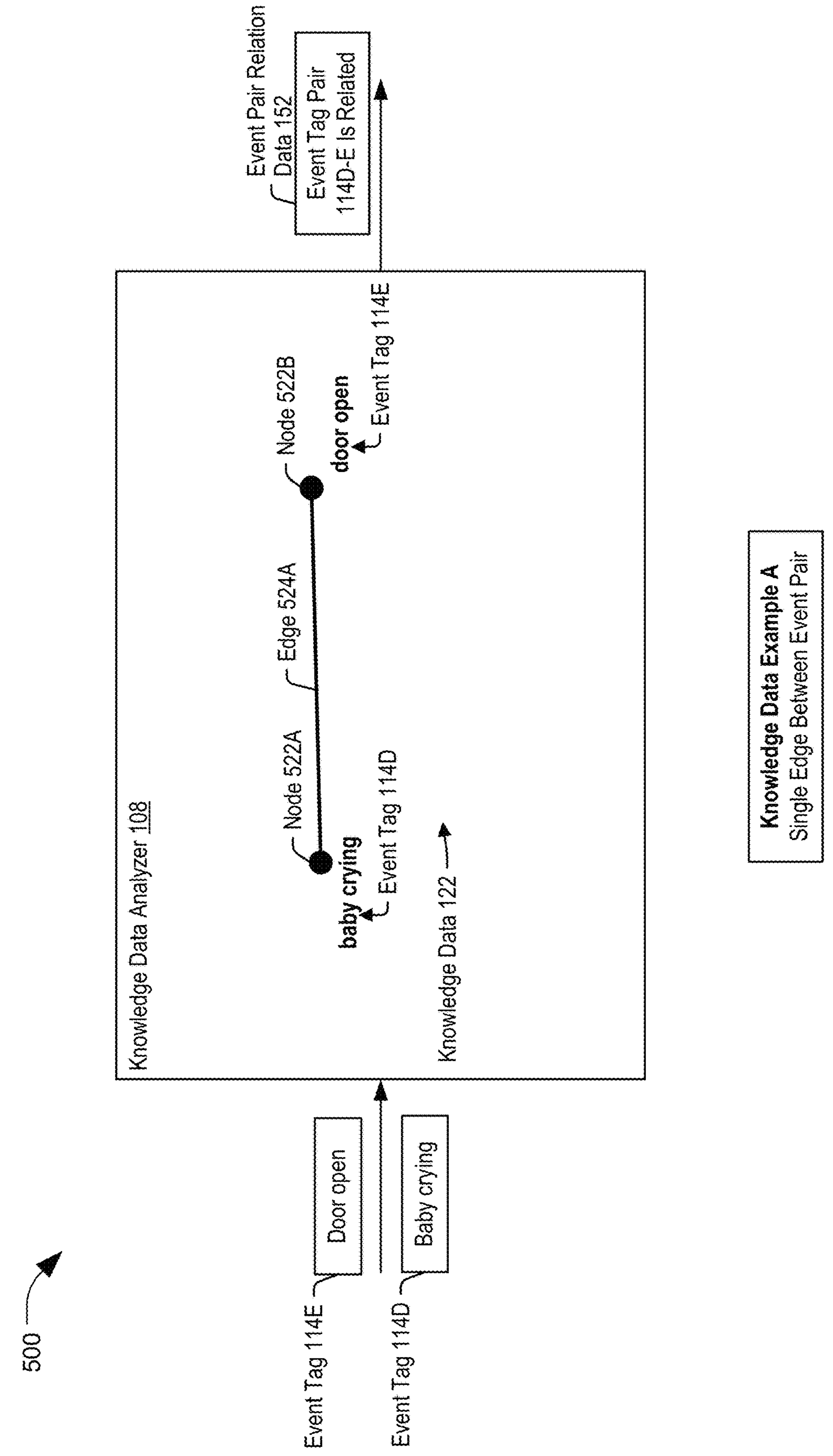
FIG. 5A is a diagram of an illustrative aspect of operations associated with a knowledge data analyzer of the system of FIG. 1, in accordance with some examples of the present disclosure.

FIG. 5A is a diagram 500 of an illustrative aspect of operations associated with the knowledge data analyzer 108, in accordance with some examples of the present disclosure. The knowledge data analyzer 108 has access to knowledge data 122. In a particular implementation, the knowledge data 122 is based on human knowledge of relations between various types of events. In some examples, the knowledge data analyzer 108 obtains the knowledge data 122 from a storage device, a network device, a website, a database, a user, or a combination thereof.

The knowledge data 122 indicates relations between audio events. In an example, the knowledge data 122 includes a knowledge graph that includes nodes 522 corresponding to audio events and edges 524 corresponding to relations. For example, the knowledge data 122 includes a node 522A representing a first audio event (e.g., sound of baby crying) described by the event tag 114D and a node 522B representing a second audio event (e.g., sound of door opening) described by an event tag 114E. The knowledge data 122 includes an edge 524A between the node 522A and the node 522B indicating that the first audio event is related to the second audio event. It should be understood that the knowledge data 122 indicating a relation between two audio events is provided as an illustrative example, in other examples the knowledge data 122 can indicate relations between additional audio events. It should be understood that the knowledge data 122 including a graph representation of relations between audio events is provided as an illustrative example, in other examples the relations between audio events can be indicated using other types of representations.

In a particular implementation, the knowledge data analyzer 108, in response to receiving the event tags 114, generates event pairs for each particular event tag with each other event tag. In an example, a count of event pairs is given by: (n*(n−1))/2, where n=count of event tags 114. For example, the knowledge data analyzer 108 generates 10 event pairs for 5 events (e.g., (5*4)/2=10).

The knowledge data analyzer 108, for each event pair, determines whether the knowledge data 122 indicates that the corresponding events are related. For example, the knowledge data analyzer 108 generates an event pair including a first audio event described by the event tag 114D and a second audio event described by the event tag 114E.

The knowledge data analyzer 108 determines that the node 522A is associated with the first audio event (described by the event tag 114D) based on a comparison of the event tag 114D and a node event tag associated with the node 522A. The knowledge data 122 including nodes associated with the same event tags 114 that are generated by the audio scene segmentor 102 is provided as an illustrative example. In this example, the knowledge data analyzer 108 determines that the node 522A is associated with the first audio event based on determining that the event tag 114D is an exact match of a node event tag associated with the node 522A.

In some examples, the knowledge data 122 can include node event tags that are different from the event tags 114 generated by the audio scene segmentor 102. In these examples, the knowledge data analyzer 108 determines that the node 522A is associated with the first audio event based on determining that a similarity metric between the event tag 114D and a node event tag associated with the node 522A satisfies a similarity criterion. To illustrate, the knowledge data analyzer 108 determines that the node 522A is associated with the first audio event based on determining that the event tag 114D has a greatest similarity to the node event tag compared to other node event tags and that a similarity between the event tag 114D and the node event tag is greater than a similarity threshold. In a particular implementation, the knowledge data analyzer 108 determines a similarity between an event tag 114 and a particular node event tag based on a comparison of the text embedding 434 of the event tag 114 and a text embedding of the particular node event tag (e.g., a node event tag embedding). For example, the similarity between the event tag 114 and the particular node event tag can be based on a Euclidean distance between the text embedding 434 and the node event text embedding in an embedding space. In another example, the similarity between the event tag 114 and the particular node event tag can be based on a cosine similarity between the text embedding 434 and the node event text embedding.

Similarly, the knowledge data analyzer 108 determines that the node 522B is associated with the second audio event (described by the event tag 114E) based on a comparison of the event tag 114E and a node event tag associated with the node 522B. The knowledge data analyzer 108, in response to determining that the knowledge data 122 indicates that the node 522A is connected via the edge 524A to the node 522B, determines that the first audio event is related to the second audio event and generates the event pair relation data 152 indicating that the first audio event described by the event tag 114D is related to the second audio event described by the event tag 114E. Alternatively, the knowledge data analyzer 108, in response to determining that there is no direct edge connecting the node 522A and the node 522B, determines that the first audio event is not related to the second audio event and generates the event pair relation data 152 indicating that the first audio event described by the event tag 114D is not related to the second audio event described by the event tag 114E. Similarly, the knowledge data analyzer 108 generates the event pair relation data 152 indicating whether the remaining event pairs (e.g., the remaining 9 event pairs) are related.

It should be understood that the knowledge data 122 is described as indicating relations without directional information as an illustrative example, in another example the knowledge data 122 can indicate directional information of the relations. To illustrate, the knowledge data 122 can include a directed edge 24 from the node 522B to the node 522A to indicate that the corresponding relation applies when the audio event (e.g., door opening) indicated by the event tag 114E is earlier than the audio event (e.g., baby crying) indicated by the event tag 114D. In this example, the knowledge data analyzer 108, in response to determining that the event tag 114D is associated with an earlier audio segment (e.g., the audio segment 112D) than the audio segment 112E associated with the event tag 114E and that the knowledge data 122 includes an edge 524 from the node 522A to the node 522B, generates the event pair relation data 152 indicating that the event tag pair 114D-E is related. Alternatively, in this example, the knowledge data analyzer 108, in response to determining that the event tag 114D (e.g., baby crying) is associated with an earlier audio segment (e.g., the audio segment 112D) than the audio segment 112E associated with the event tag 114E (e.g., door opening) and that the knowledge data 122 does not include any edge 524 from the node 522A to the node 522B, generates the event pair relation data 152 indicating that the event tag pair 114D-E are not related, independently of whether an edge in the other direction from the node 522B to the node 522A is included in the knowledge data 122.

Figure 5B:
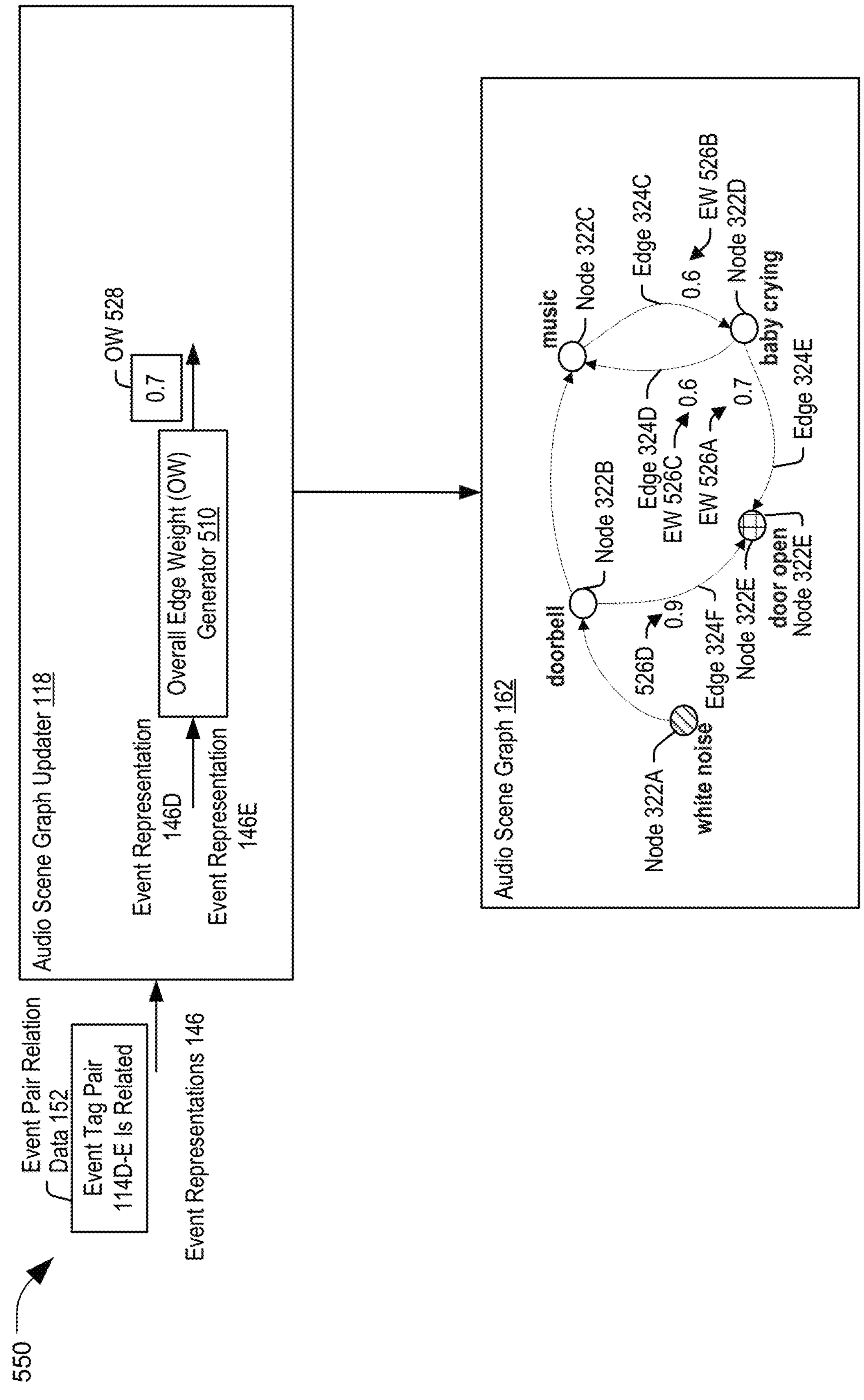
FIG. 5B is a diagram of an illustrative aspect of operations associated with an audio scene graph updater of the system of FIG. 1, in accordance with some examples of the present disclosure.

FIG. 5B is a diagram 550 of an illustrative aspect of operations associated with the audio scene graph updater 118, in accordance with some examples of the present disclosure. The audio scene graph updater 118 is configured to assign, based on the event pair relation data 152 and the event representations 146, edge weights to the edges 324 of the audio scene graph 162. The audio scene graph updater 118 includes an overall edge weight (OW) generator 510 that is configured to generate an overall edge weight 528 based on a similarity metric of a pair of event representations 146.

The audio scene graph updater 118, in response to receiving event pair relation data 152 indicating that an event pair is related, generates an overall edge weight 528 corresponding to the event pair. For example, the audio scene graph updater 118, in response to determining that the event pair relation data 152 indicates that a first audio event described by the event tag 114D is related to a second audio event described by the event tag 114E, uses the overall edge weight generator 510 to determine an overall edge weight 528 associated with the first audio event and the second audio event.

The audio scene graph updater 118 obtains an event representation 146D of the first audio event and an event representation 146E of the second audio event. The event representation 146D is based on the audio segment 112D and the event tag 114D, and the event representation 146E is based on the audio segment 112E and the event tag 114E, as described with reference to FIG. 4.

The overall edge weight generator 510 determines the overall edge weight 528 (e.g., 0.7) corresponding to a similarity metric associated with the event representation 146D and the event representation 146E. In an example, the similarity metric is based on a cosine similarity between the event representation 146D and the event representation 146E.

The audio scene graph updater 118, in response to determining that the event pair relation data 152 indicates that the knowledge data 122 indicates a single relation between the first audio event (described by the event tag 114D) and the second audio event (described by the event tag 114E), assigns the overall edge weight 528 as an edge weight 526A (e.g., 0.7) to the edge 324E between the node 322D (associated with the event tag 114D) and the node 322E (associated with the event tag 114E).

In a particular implementation, the audio scene graph updater 118 assigns the overall edge weight 528 as the edge weight 526A to the edge 324E based on determining that the knowledge data 122 indicates a single relation between the first audio event and the second audio event and that the audio scene graph 162 includes a single edge (e.g., a unidirectional edge) between the node 322D and the node 322E.

If the audio scene graph 162 includes multiple edges (e.g., a bi-directional edge), the audio scene graph updater 118 can split the overall edge weight among the multiple edges. For example, the audio scene graph updater 118 determines an overall edge weight (e.g., 1.2) corresponding to a first audio event (e.g., sound of music) associated with the node 322C and a second audio event (e.g., sound of baby crying) associated with the node 322D. The audio scene graph updater 118, in response to determining that the knowledge data 122 indicates a single relation between the first audio event (e.g., sound of music) and the second audio event (e.g., sound of baby crying), and that the audio scene graph 162 includes two edges (e.g., the edge 324C and the edge 324D) between the node 322C and the node 322D, splits the overall edge weight (e.g., 1.2) into an edge weight 526B (e.g., 0.6) and an edge weight 526C (e.g., 0.6). The audio scene graph updater 118 assigns the edge weight 526B to the edge 324C and assigns the edge weight 526C to the edge 324D.

In a particular implementation, the audio scene graph updater 118, in response to determining that the event pair relation data 152 indicates a relation between a pair of audio events that are not directly connected in the audio scene graph 162, adds an edge between the pair of audio events and assigns an edge weight to the edge. For example, the audio scene graph updater 118, in response to determining that the event pair relation data 152 indicates that a first audio event (e.g., sound of doorbell) is related to a second audio event (e.g., sound of door opening), and that the audio scene graph 162 indicates that there are no edges between the node 322B associated with the first audio event and the node 322C associated with the second audio event, adds an edge 324F between the node 322B and the node 322E. A direction of the edge 324F is based on a temporal order of the first audio event relative to the second audio event. For example, the audio scene graph updater 118 adds the edge 324F from the node 322B to the node 322E based on determining that the audio segment temporal order 164 indicates that the first audio event (e.g., sound of doorbell) is earlier than the second audio event (e.g., sound of door opening). The overall edge weight generator 510 determines an overall edge weight (e.g., 0.9) corresponding to the first audio event (e.g., sound of doorbell) and the second audio event (e.g., sound of door opening), and assigns the overall edge weight to the edge 324F.

The audio scene graph updater 118 thus assigns edge weights to edges corresponding to audio event pairs based on a similarity between the event representations of the audio event pairs. Audio event pairs with similar audio embeddings and similar text embeddings are more likely to be related.

In a particular example in which the knowledge data 122 includes directional information of the relations, the audio scene graph updater 118 assigns the overall edge weight 528 as the edge weight 526A if the temporal order of the audio events associated with a direction of the edge 324E matches the temporal order of the relation of the audio events indicated by the knowledge data 122.

Figure 6A:
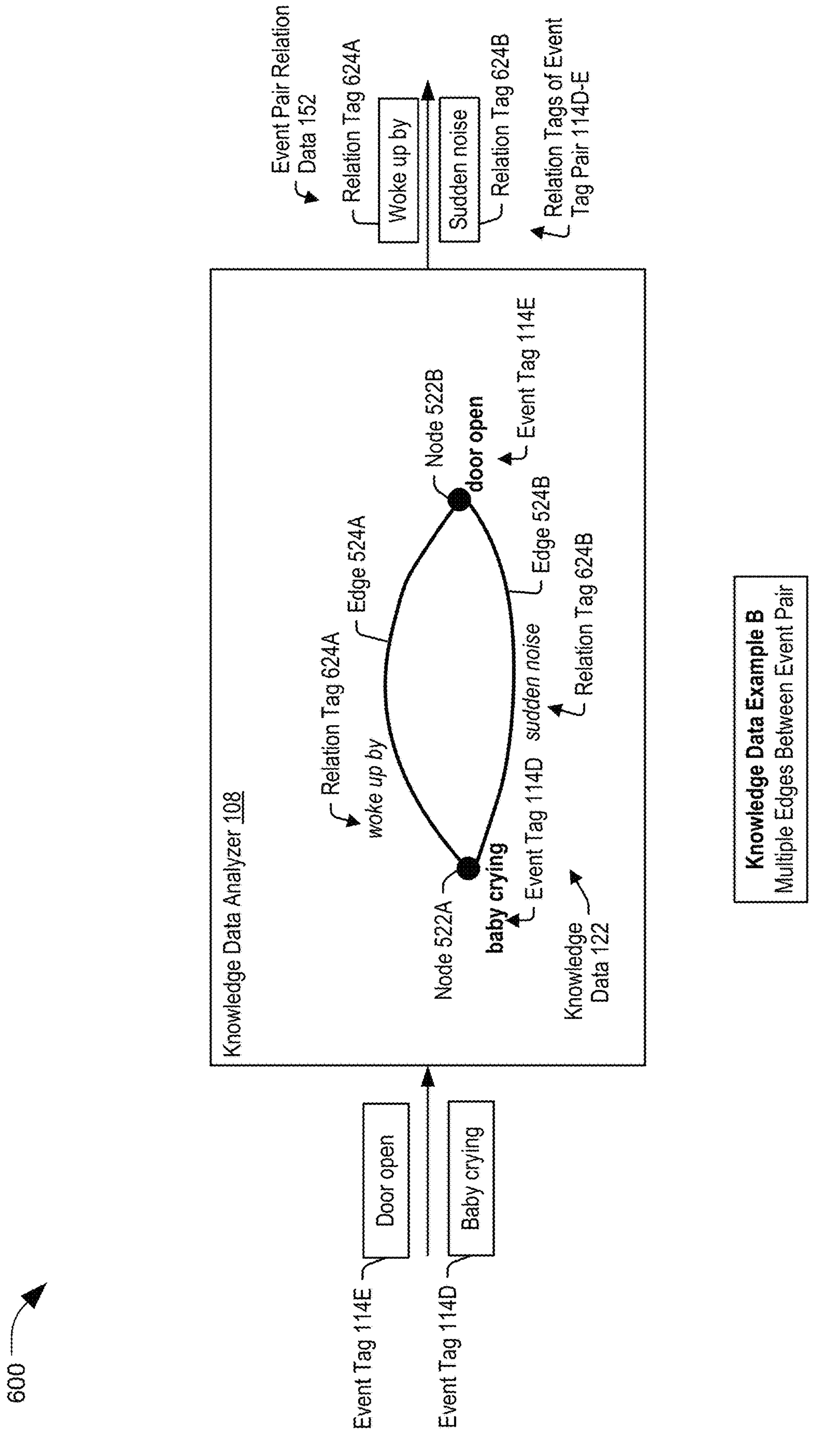
FIG. 6A is a diagram of another illustrative aspect of operations associated with the knowledge data analyzer of the system of FIG. 1, in accordance with some examples of the present disclosure.

FIG. 6A is a diagram 600 of an illustrative aspect of operations associated with the knowledge data analyzer 108, in accordance with some examples of the present disclosure.

The knowledge data 122 indicates multiple relations between at least some audio events. In an example, the knowledge data 122 includes the node 522A representing a first audio event (e.g., sound of baby crying) described by the event tag 114D and the node 522B representing a second audio event (e.g., sound of door opening) described by the event tag 114E. The knowledge data 122 includes an edge 524A between the node 522A and the node 522B indicating a first relation between the first audio event and the second audio event. The knowledge data 122 also includes an edge 524B between the node 522A and the node 522B indicating a second relation between the first audio event and the second audio event. The edge 524A is associated with a relation tag 624A (e.g., woke up by) that describes the first relation. The edge 524B is associated with a relation tag 624B (e.g., sudden noise) that describes the second relation.

The knowledge data analyzer 108, in response to determining that the knowledge data 122 indicates that the node 522A is connected via multiple edges (e.g., the edge 524A and the edge 524B) to the node 522B, determines that the first audio event is related to the second audio event and generates the event pair relation data 152 indicating the multiple relations between the first audio event described by the event tag 114D and the second audio event described by the event tag 114E. For example, the event pair relation data 152 indicates that the audio event pair corresponding to the event tag 114D and the event tag 114E have multiple relations indicated by the relation tag 624A and the relation tag 624B.

It should be understood that the knowledge data 122 is described as indicating relations without directional information as an illustrative example, in another example the knowledge data 122 can indicate directional information of the relations. To illustrate, the knowledge data 122 can include a directed edge 524 from the node 522B to the node 522A to indicate that the corresponding relation indicated by the relation tag 624A (e.g., woke up by) applies when the audio event (e.g., door opening) indicated by the event tag 114E is earlier than the audio event (e.g., baby crying) indicated by the event tag 114D. In this example, the knowledge data analyzer 108, in response to determining that the event tag 114D is associated with an earlier audio segment (e.g., the audio segment 112D) than the audio segment 112E associated with the event tag 114E and that the knowledge data 122 includes an edge 524 from the node 522A to the node 522B, generates the event pair relation data 152 indicating that the event tag pair 114D-E is related. Alternatively, in this example, the knowledge data analyzer 108, in response to determining that the event tag 114D is associated with an earlier audio segment (e.g., the audio segment 112D) than the audio segment 112E associated with the event tag 114E and that the knowledge data 122 does not include any edge 524 from the node 522A to the node 522B, generates the event pair relation data 152 indicating that the event tag pair 114D-E are not related, independently of whether an edge in the other direction from the node 522B to the node 522A is included in the knowledge data 122.

Figure 6B:
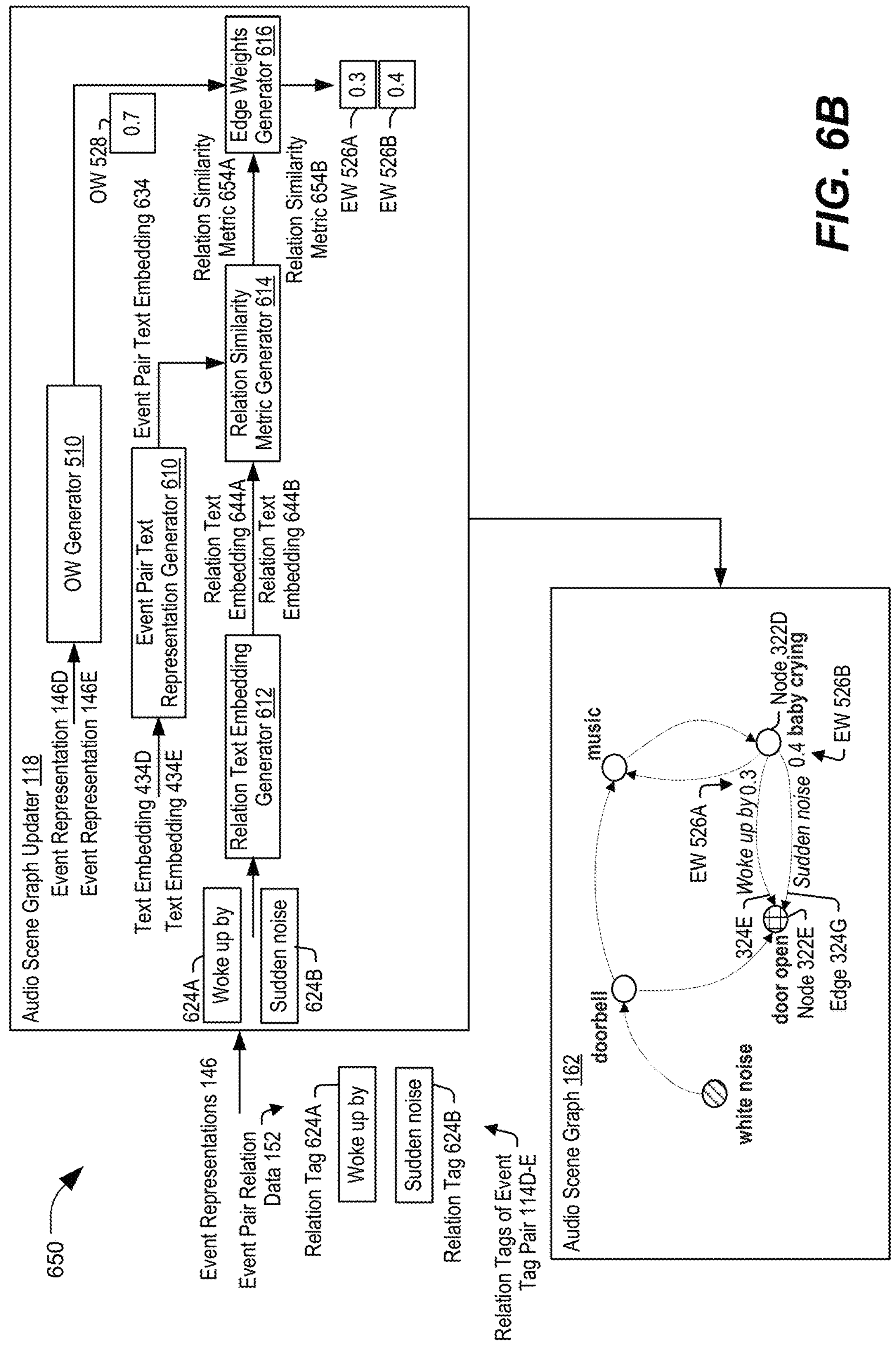
FIG. 6B is a diagram of another illustrative aspect of operations associated with the audio scene graph updater of the system of FIG. 1, in accordance with some examples of the present disclosure.

FIG. 6B is a diagram 650 of an illustrative aspect of operations associated with the audio scene graph updater 118, in accordance with some examples of the present disclosure. The audio scene graph updater 118 is configured to assign edge weights to the edges 324 that are between nodes 322 corresponding to audio event pairs with multiple relations.

The audio scene graph updater 118 includes the overall edge weight generator 510 coupled to an edge weights generator 616. The audio scene graph updater 118 also includes a relation similarity metric generator 614 coupled to an event pair text representation generator 610, a relation text embedding generator 612, and the edge weights generator 616.

The event pair text representation generator 610 is configured to generate an event pair text embedding 634 based on text embeddings 434 of the audio event pair. For example, the event pair text representation generator 610 generates the event pair text embedding 634 of a first audio event (e.g., sound of baby crying) and a second audio event (e.g., sound of door opening). The event pair text embedding 634 is based on a text embedding 434D of the event tag 114D that describes the first audio event and a text embedding 434E of the event tag 114E that describes the second audio event. In an example, the text embedding 434D includes first feature values of a set of features, and the text embedding 434E includes second feature values of the set of features. In this example, the event pair text embedding 634 includes third feature values of the set of features. The third feature values are based on the first feature values and the second feature values. For example, the first feature values include a first feature value of a first feature, the second feature values include a second feature value of the first feature, and the third feature values include a third feature value of the first feature. The third feature value is based on (e.g., an average of) the first feature value and the second feature value. In a particular implementation, the event pair text representation generator 610 generates the event pair text embedding 634 in response to determining that the knowledge data 122 indicates that the audio event pair includes multiple relations.

The relation text embedding generator 612 generates relation text embeddings 644 of the multiple relations of the audio event pair. For example, the relation text embedding generator 612, in response to determining that the event pair relation data 152 indicates multiple relation tags of the audio event pair, generates a relation text embedding 644 of each of the multiple relation tags. To illustrate, the relation text embedding generator 612 generates a relation text embedding 644A and a relation text embedding 644B corresponding to the relation tag 624A and the relation tag 624B, respectively. In a particular implementation, the relation text embedding generator 612 performs similar operations described with reference to the event tag representation generator 424 of FIG. 4.

A relation text embedding 644 can correspond to a numerical representation that captures the semantic meaning and contextual information of a relation tag 624. In an example, the relation text embedding 644 includes a text feature vector including feature values of text features. In some implementations, the relation text embedding generator 612 includes a machine learning model (e.g., a deep neural network) that is trained on labeled text to generate text embeddings. According to some implementations, the relation text embedding generator 612 pre-processes the relation tag 624 prior to generating the relation text embedding 644. The pre-processing can include converting text to lowercase, removing punctuation, handling special characters, tokenizing the relation tag 624 into individual words or subword units, or a combination thereof.

The relation similarity metric generator 614 generates relation similarity metrics 654 based on the event pair text embedding 634 and the relation text embeddings 644. For example, the relation similarity metric generator 614 determines a relation similarity metric 654A (e.g., a cosine similarity) of the relation text embedding 644A and the event pair text embedding 634. Similarly, the relation similarity metric generator 614 determines a relation similarity metric 654B (e.g., a cosine similarity) of the relation text embedding 644B and the event pair text embedding 634.

The edge weights generator 616 is configured to determine edge weights 526 of the multiple relations based on the relation similarity metrics 654 and the overall edge weight 528. For example, the edge weights generator 616 determines an edge weight 526A based on the overall edge weight 528 and a ratio of the relation similarity metric 654A and a sum of the relation similarity metrics 654 (e.g., the edge weight 526A=the overall edge weight 528*(the relation similarity metric 654A/the sum of the relation similarity metrics 654)). Similarly, the edge weights generator 616 generates an edge weight 526B based on the overall edge weight 528 and a ratio of the relation similarity metric 654B and the sum of the relation similarity metrics 654 (e.g., the edge weight 526B=the overall edge weight 528*(the relation similarity metric 654B/the sum of the relation similarity metrics 654)).

The audio scene graph updater 118 assigns the edge weight 526A (e.g., 0.3) and the relation tag 624A (e.g., "Woke up by") to the edge 324E. The audio scene graph updater 118 adds one or more edges between the node 322D and the node 322E for the remaining relation tags of the multiple relations, and assigns a relation tag and edge weight to each of the added edges. For example, the audio scene graph updater 118 adds an edge 324G between the node 322D and the node 322E. The edge 324G has the same direction as the edge 324E. The audio scene graph updater 118 assigns the edge weight 526B (e.g., 0.4) and the relation tag 624B (e.g., "Sudden noise") to the edge 324G.

If the audio scene graph 162 includes multiple edges (e.g., a bi-directional edge), the audio scene graph updater 118 can split the edge weight 526 for a particular relation among the multiple edges. For example, the audio scene graph updater 118 assigns a first portion (e.g., half) of the edge weight 526A (e.g., 0.3) and the relation tag 624A to the edge 324E from the node 322D to the node 322E, and assigns a remaining portion (e.g., half) of the edge weight 526A (e.g., 0.3) and the relation tag 624A to an edge from the node 322E to the node 322D.

The audio scene graph updater 118 thus assigns portions of the overall edge weight 528 as edge weights to edges corresponding to relations based on a similarity between the event pair text embedding 634 and a corresponding relation text embedding 644. Relations with relation tags that have relation text embeddings that are more similar to the event pair text embedding 634 are more likely to be accurate (e.g., have greater strength). For example, a first audio event (e.g., baby crying) and a second audio event (e.g., music) have a first relation with a first relation tag (e.g., upset by) and a second relation with a second relation tag (e.g., listening). The first relation tag (e.g., upset by) has a first relation embedding that is more similar to the event pair text embedding 634 than a second relation embedding of the second relation tag (e.g., listening) is to the event pair text embedding 634. The first relation is likely to be stronger than the second relation.

In a particular example in which the knowledge data 122 includes directional information of the relations, the audio scene graph updater 118 assigns the edge weight 526A if the temporal order of the audio events associated with a direction of the edge 324E matches the temporal order of the corresponding relation of the audio events indicated by the knowledge data 122.

Figure 7:
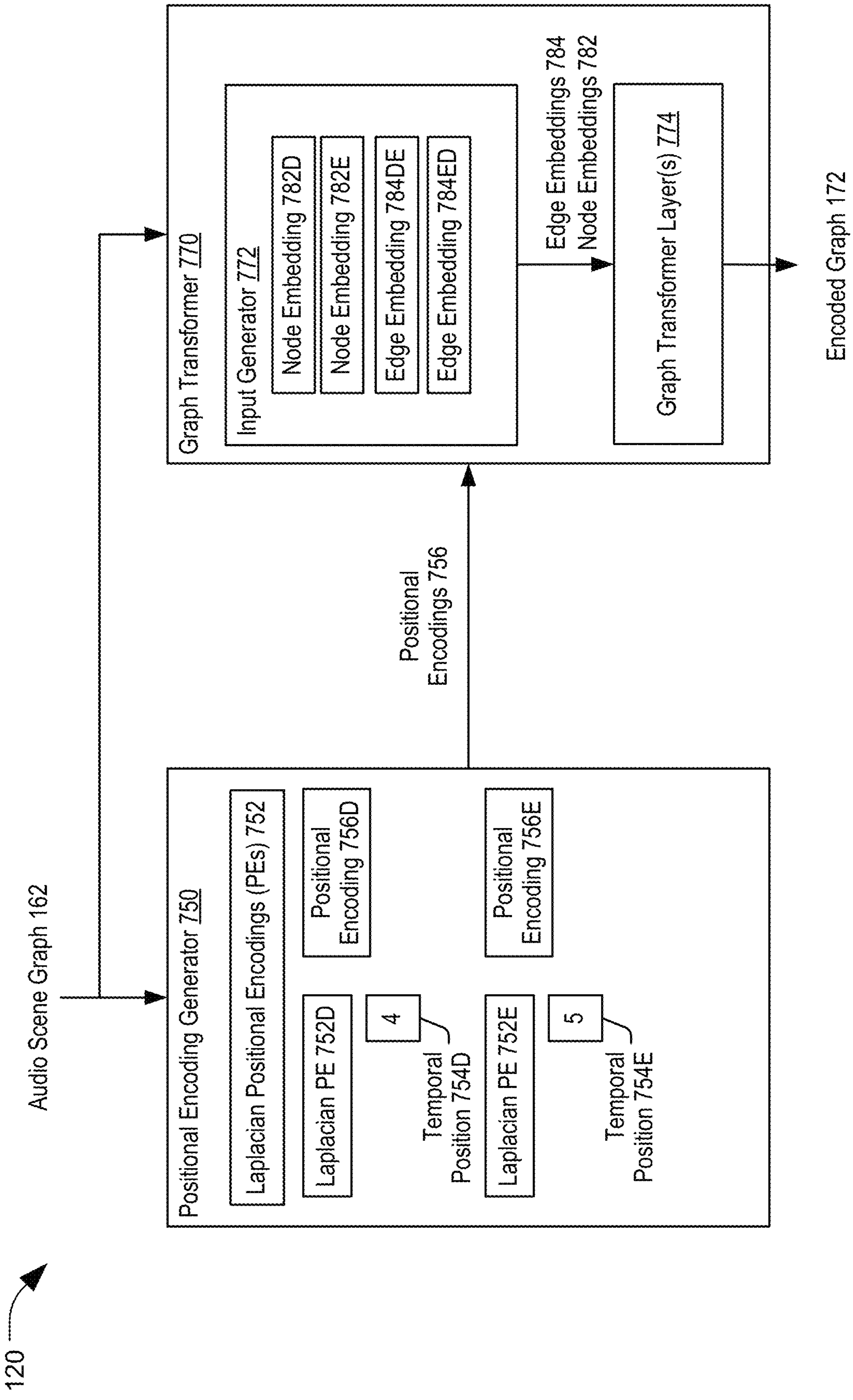
FIG. 7 is a diagram of an illustrative aspect of operations associated with a graph encoder of the system of FIG. 1, in accordance with some examples of the present disclosure.

FIG. 7 is a diagram of an illustrative aspect of operations associated with the graph encoder 120, in accordance with some examples of the present disclosure. The graph encoder 120 includes a positional encoding generator 750 coupled to a graph transformer 770.

The graph encoder 120 is configured to encode the audio scene graph 162 to generate the encoded graph 172. The positional encoding generator 750 is configured to generate positional encodings 756 of the nodes 322 of the audio scene graph 162. The graph transformer 770 is configured to encode the audio scene graph 162 based on the positional encodings 756 to generate the encoded graph 172.

According to some implementations, the positional encoding generator 750 is configured to determine temporal positions 754 of the nodes 322. For example, the positional encoding generator 750 determines the temporal positions 754 based on the audio segment temporal order 164 of the audio segments 112 corresponding to the nodes 322. To illustrate, the positional encoding generator 750 assigns a first temporal position 754 (e.g., 1) to the node 322A associated with the audio segment 112A having an earliest playback start time (e.g., 0 seconds) as indicated by the audio segment temporal order 164. Similarly, the positional encoding generator 750 assigns a second temporal position 754 (e.g., 2) to the node 322B associated with the audio segment 112A having a second earliest playback time (e.g., 2 seconds) as indicated by the audio segment temporal order 164, and so on. The positional encoding generator 750 assigns a temporal position 754D (e.g., 4) to the node 322D corresponding to a playback start time of the audio segment 112D, and assigns a temporal position 754E (e.g., 5) to the node 322E corresponding to a playback start time of the audio segment 112E.

According to some implementations, the positional encoding generator 750 determines Laplacian positional encodings 752 of the nodes 322 of the audio scene graph 162. For example, the positional encoding generator 750 generates a Laplacian positional encoding 752D that indicates a position of the node 322D relative to other nodes in the audio scene graph 162. As another example, the positional encoding generator 750 generates a Laplacian positional encoding 752E that indicates a position of the node 322E relative to other nodes in the audio scene graph 162.

The positional encoding generator 750 generates the positional encodings 756 based on the temporal positions 754, the Laplacian positional encodings 752, or a combination thereof. For example, the positional encoding generator 750 generates the positional encoding 756D based on the temporal position 754D, the Laplacian positional encoding 752D, or both. To illustrate, the positional encoding 756D can be a combination (e.g., a concatenation) of the temporal position 754D and the Laplacian positional encoding 752D. In a particular implementation, the positional encoding 756D corresponds to a weighted sum of an encoding of the temporal position 754D and the Laplacian positional encoding 752D according to: the positional encoding 756D=w1*encoding of the temporal position 754D+w2*Laplacian positional encoding 752D, where w1 and w2 are weights. Similarly, the positional encoding generator 750 generates the temporal position 754E based on the temporal position 754E, the Laplacian positional encoding 752E, or both. The positional encoding generator 750 provides the positional encodings 756 to the graph transformer 770.

The graph transformer 770 includes an input generator 772 coupled to one or more graph transformer layers 774. The input generator 772 is configured to generate node embeddings 782 of the nodes 322 of the audio scene graph 162. For example, the input generator 772 generates a node embedding 782D of the node 322D. In a particular aspect, the node embedding 782D is based on the audio segment 112D, the event tag 114D, an audio embedding 432 of the audio segment 112D, a text embedding 434 of the event tag 114D, the event representation 146D, or a combination thereof. Similarly, the input generator 772 generates a node embedding 782E of the node 322E.

The input generator 772 is also configured to generate edge embeddings 784 of the edges 324 of the audio scene graph 162. For example, the input generator 772 generates an edge embedding 784DE of the edge 324E from the node 322D to the node 322E. In a particular aspect, the edge embedding 784DE is based on any relation tag 624 associated with the edge 324E, an edge weight 526A associated with the edge 324E, or both. In an example in which the audio scene graph 162 includes an edge 324 from the node 322E to the node 322D, the input generator 772 generates an edge embedding 784ED of the edge 324.

In an example in which the audio scene graph 162 includes multiple edges from the node 322D to the node 322E corresponding to multiple relations, the edge embeddings 784 include multiple edge embeddings corresponding to the multiple edges. In an example in which the audio scene graph 162 includes multiple edges from the node 322E to the node 322D corresponding to multiple relations, the edge embeddings 784 include multiple edge embeddings corresponding to the multiple edges.

The input generator 772 provides the node embeddings 782 and the edge embeddings 784 to the one or more graph transformer layers 774. The one or more graph transformer layers 774 process the node embeddings 782 and the edge embeddings 784 based on the positional encodings 756 to generate the encoded graph 172, as further described with reference to FIG. 8

Figure 8:
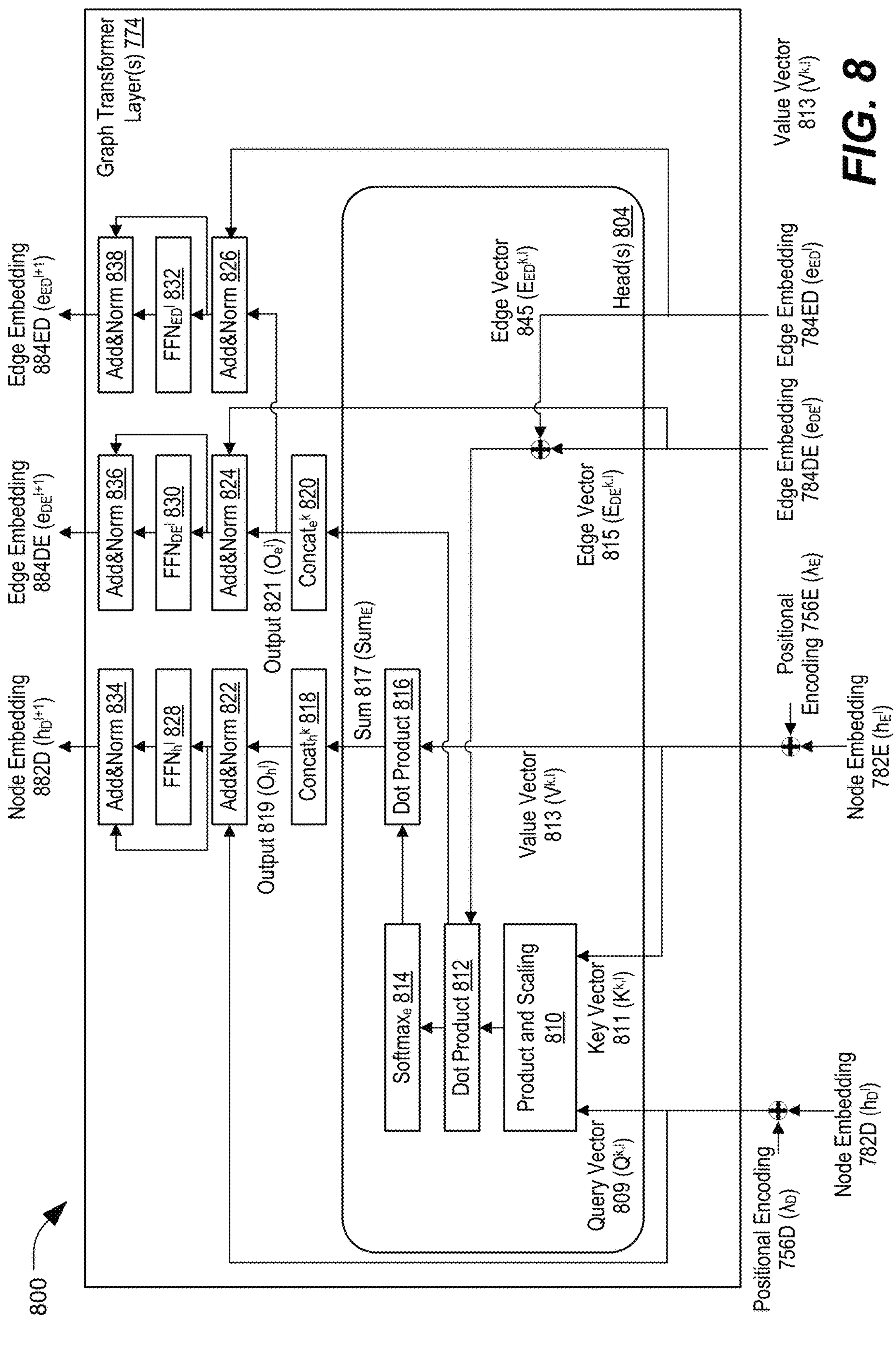
FIG. 8 is a diagram of an illustrative aspect of operations associated with one or more graph transformer layers of the system of FIG. 1, in accordance with some examples of the present disclosure.

FIG. 8 is a diagram of an illustrative aspect of operations associated with the one or more graph transformer layers 774, in accordance with some examples of the present disclosure. Each graph transformer layer of the one or more graph transformer layers 774 includes one or more heads 804 (e.g., one or more attention heads). Each of the one or more heads 804 includes a product and scaling layer 810 coupled via a dot product layer 812 to a softmax layer 814. The softmax layer 814 is coupled to a dot product layer 816. The one or more heads 804 of the graph transformer layer are coupled to a concatenation layer 818 and to a concatenation layer 820 of the graph transformer layer. For example, the dot product layer 816 of each of the one or more heads 804 is coupled to the concatenation layer 818 and the dot product layer 812 of each of the one or more heads 804 is coupled to the concatenation layer 820.

The graph transformer layer includes the concatenation layer 818 coupled via an addition and normalization layer 822 and a feed forward network 828 to an addition and normalization layer 834. The graph transformer layer also includes the concatenation layer 820 coupled via an addition and normalization layer 824 and a feed forward network 830 to an addition and normalization layer 836. The graph transformer includes the concatenation layer 820 coupled via an addition and normalization layer 826 and a feed forward network 832 to an addition and normalization layer 838.

The node embeddings 782, the edge embeddings 784, and the positional encodings 756 are provided as an input to an initial graph transformer layer of the one or more graph transformer layers 774. An output of a previous graph transformer layer is provided as an input to a subsequent graph transformer layer. An output of a last graph transformer layer corresponds to the encoded graph 172.

A combination of the positional encoding 756D and the node embedding 782D of the node 322D is provided as a query vector 809 to a head 804. A combination of the node embedding 782E and the positional encoding 756E of the node 322E is provided as a key vector 811 and as a value vector 813 to the head 804. If the audio scene graph 162 includes an edge from the node 322D to the node 322E, an edge embedding 784DE is provided as an edge vector 815 to the head 804. If the audio scene graph 162 includes an edge from the node 322E to the node 322D, an edge embedding 784ED is provided as an edge vector 845 to the head 804.

The product and scaling layer 810 of the head 804 generates a product of the query vector 809 and the key vector 811 and performs scaling of the product. The dot product layer 812 generates a dot product of the output of the product and scaling layer 810 and a combination (e.g., a concatenation) of the edge vector 815 and the edge vector 845. The output of the dot product layer 812 is provided to each of the softmax layer 814 and the concatenation layer 820. The softmax layer 814 performs a normalization operation of the output of the dot product layer 812. The dot product layer 816 generates a dot product of the output of the softmax layer 814 and the value vector 813. A summation 817 of an output of the dot product layer 816 is provided to the concatenation layer 818.

The concatenation layer 818 concatenates the summation 817 of the dot product layer 816 of each of the one or more heads 804 of the graph transformer layer to generate an output 819. The concatenation layer 820 concatenates the output of the dot product layer 812 of each of the one or more heads 804 of the graph transformer layer to generate an output 821. The addition and normalization layer 822 performs addition and normalization of the query vector 809 and the output 819 to generate an output that is provided to each of the feed forward network 828 and the addition and normalization layer 834.

The addition and normalization layer 824 performs addition and normalization of the edge embedding 784DE and the output 821 to generate an output that is provided to each of the feed forward network 830 and the addition and normalization layer 836. The addition and normalization layer 826 performs addition and normalization of the edge embedding 784ED and the output 821 to generate an output that is provided to each of the feed forward network 832 and the addition and normalization layer 838.

The addition and normalization layer 834 performs addition and normalization of the output of the addition and normalization layer 822 and an output of the feed forward network 828 to generate a node embedding 882D corresponding to the node 322D. Similar operations may be performed to generate a node embedding 882 corresponding to the node 322E. The addition and normalization layer 836 performs addition and normalization of the output of the addition and normalization layer 824 and an output of the feed forward network 830 to generate an edge embedding 884DE. The addition and normalization layer 838 performs addition and normalization of the output of the addition and normalization layer 826 and an output of the feed forward network 832 to generate an edge embedding 884ED.

According to some implementations, layer update equations for a graph transformer layer (l) are given by the following Equations:

$$\hat{h}_i^{l+1} = O_h^l \|_{k=1}^{H} \left( \sum_{j \in N_i} w_{ij}^{k,l} V^{k,l} h_j^l \right), \quad \text{Equation 1}$$

$$\hat{e}_{ij}^{l+1} = O_e^l \|_{k=1}^{H} \left( \hat{w}_{ij}^{k,l} \right), \text{ where} \quad \text{Equation 2}$$

$$w_{ij}^{k,l} = softmax_j \left( \hat{w}_{ij}^{k,l} \right), \quad \text{Equation 3}$$

$$\hat{w}_{ij}^{k,l} = \left( \frac{Q^{k,l} h_i^l \cdot K^{k,l} h_j^l}{\sqrt{d_k}} \right) \cdot \left( E_1^{k,l} e_{ij1}^l + E_2^{k,l} e_{ij2}^l \right), \quad \text{Equation 4}$$

where i denotes a node (e.g., the node 322D), $$O_h^l$$

denotes the output 819 of the concatenation layer 818 of the graph transformer layer (l), || denotes concatenation, k=1 to H denotes the number of attention head, j denotes a node (e.g., the node 322E) that is included in a set of neighbors ($N_i$) of (directly connected to) the node i, $V^{k,l}$ denotes a value vector (e.g., the value vector 813), and $$h_j^l$$

denotes a node embedding of the node j (e.g., the node embedding 782E).

$$O_e^l$$

denotes the output 819 of the concatenation layer 818, $$\left( \frac{Q^{k,l} h_i^l \cdot K^{k,l} h_j^l}{\sqrt{d_k}} \right)$$

denotes an output of the product and scaling layer 810, $$\hat{w}_{ij}^{k,l}$$

denotes an output of the dot product layer 812, denotes $$w_{ij}^{k,l}$$

an output of the softmax layer 814, $Q^{k,l}$ denotes the query vector 809, $$h_i^l$$

denotes a node embedding of the node i (e.g., the node embedding 782D), $K^{k,l}$ denotes the key vector 811, $d_k$ denotes dimensionality of the key vector 811, $$E_1^{k,l}$$

denotes an edge vector (e.g., the edge vector 815) of a first edge embedding (e.g., the edge embedding 784DE), and $$E_2^{k,l}$$

denotes an edge vector (e.g., the edge vector 845) of a second edge embedding (e.g., the edge embedding 784ED).

$$\hat{h}_i^{l+1}$$

denotes an output of the addition performed by the addition and normalization layer 822, and $$\hat{e}_{ij}^{l+1}$$

denotes an output of the addition performed by each of the addition and normalization layer 824 and the addition and normalization layer 826. The outputs $$\hat{h}_i^{l+1}$$

and $$\hat{e}_{ij}^{l+1}$$

are passed to separate feed forward networks preceded and succeeded by residual connections and normalization layers, given by the following Equations:

$$\hat{\hat{h}}_i^{l+1} = Norm\left(h_i^l + \hat{h}_i^{l+1}\right), \quad \text{Equation 5}$$

$$\hat{\hat{\hat{h}}}_i^{l+1} = W_{h,2}^l \text{Re}LU\left(W_{h,1}^l + \hat{\hat{h}}_i^{l+1}\right), \quad \text{Equation 6}$$

$$h_i^{l+1} = Norm\left(\hat{\hat{h}}_i^{l+1} + \hat{\hat{\hat{h}}}_i^{l+1}\right), \quad \text{Equation 7}$$

$$\hat{\hat{e}}_{ij1}^{l+1} = Norm\left(e_{ij1}^l + \hat{e}_{ij}^{l+1}\right), \quad \text{Equation 8}$$

$$\hat{\hat{\hat{e}}}_{ij1}^{l+1} = W_{e,2}^l \text{Re}LU\left(W_{e,1}^l + \hat{\hat{e}}_{ij1}^{l+1}\right), \quad \text{Equation 9}$$

$$e_{ij1}^{l+1} = Norm\left(\hat{\hat{e}}_{ij1}^{l+1} + \hat{\hat{\hat{e}}}_{ij1}^{l+1}\right), \quad \text{Equation 10}$$

-continued $$\hat{\hat{e}}_{ij2}^{l+1} = Norm\left(e_{ij2}^l + \hat{e}_{ij}^{l+1}\right), \quad \text{Equation 11}$$

$$\hat{\hat{\hat{e}}}_{ij2}^{l+1} = W_{e,2}^l \text{Re}LU\left(W_{e,1}^l + \hat{\hat{e}}_{ij2}^{l+1}\right), \quad \text{Equation 12}$$

$$e_{ij2}^{l+1} = Norm\left(\hat{\hat{e}}_{ij2}^{l+1} + \hat{\hat{\hat{e}}}_{ij2}^{l+1}\right), \quad \text{Equation 13}$$

where $$\hat{\hat{h}}_i^{l+1}$$

denotes an output of the addition and normalization layer 822, $$\hat{\hat{\hat{h}}}_i^{l+1}$$

corresponds to an intermediate representation, $$h_i^{l+1}$$

(e.g., the node embedding 882D) denotes an output of the addition and normalization layer 834, $$\hat{\hat{e}}_{ij1}^{l+1}$$

denotes an output of the addition and normalization layer 824, $$\hat{\hat{\hat{e}}}_{ij1}^{l+1}$$

denotes an intermediate representation, $$e_{ij1}^{l+1}$$

(e.g., the edge embedding 884DE) denotes an output of the addition and normalization layer 836, $$\hat{\hat{e}}_{ij2}^{l+1}$$

denotes an output of the addition and normalization layer 826, $$\hat{\hat{\hat{e}}}_{ij2}^{l+1}$$

denotes an intermediate representation, and $$e_{ij2}^{l+1}$$

(e.g., the edge embedding 884EE) denotes an output of the addition and normalization layer 838.

$$W_{h,1}^{l},\ W_{h,2}^{l},\ W_{e,1}^{l},\ \text{and}\ W_{e,2}^{l}$$

denote intermediate representations, and ReLU denotes a rectified linear unit activation function.

If the one or more graph transformer layers 774 include a subsequent graph transformer layer, the node embedding 882D, the node embedding 882 corresponding to the node 322E, the edge embedding 884DE, and the edge embedding 884ED are provided as input to the subsequent graph transformer layer. For example, the node embedding 882D is provided as a query vector 809 to the subsequent graph transformer layer, and the node embedding 882 corresponding to the node 322E is provided as a key vector 811 and as a value vector 813 to the subsequent graph transformer layer. In some aspects, a combination of the edge embedding 884DE and the edge embedding 884ED is provided as input to the dot product layer 812 of a head 804 of the subsequent graph transformer layer. The edge embedding 884DE is provided as an input to the addition and normalization layer 824 of the subsequent graph transformer layer. The edge embedding 884ED is provided as an input to the addition and normalization layer 826 of the subsequent graph transformer layer.

The node embedding 882D, the edge embedding 884DE, and the edge embedding 884ED of a last graph transformer layer of the one or more graph transformer layers 774 are included in the encoded graph 172. Similar operations are performed corresponding to other nodes 322 of the audio scene graph 162.

The one or more graph transformer layers 774 processing two edge embeddings (e.g., the edge embedding 784DE and the edge embedding 784ED) for a pair of nodes (e.g., the node 322D and the node 322E) is provided as an illustrative example. In other examples, the audio scene graph 162 can include fewer than two edges or more than two edges between a pair of nodes, and the one or more graph transformer layers 774 process the corresponding edge embeddings for the pair of nodes. To illustrate, the one or more graph transformer layers 774 can include one or more additional edge layers, with each edge layer including a first addition and normalization layer coupled to a feed forward network and a second addition and normalization layer. The concatenation layer 820 of the graph transformer layer is coupled to the first addition and normalization layer of each of the edge layers.

Figure 9:
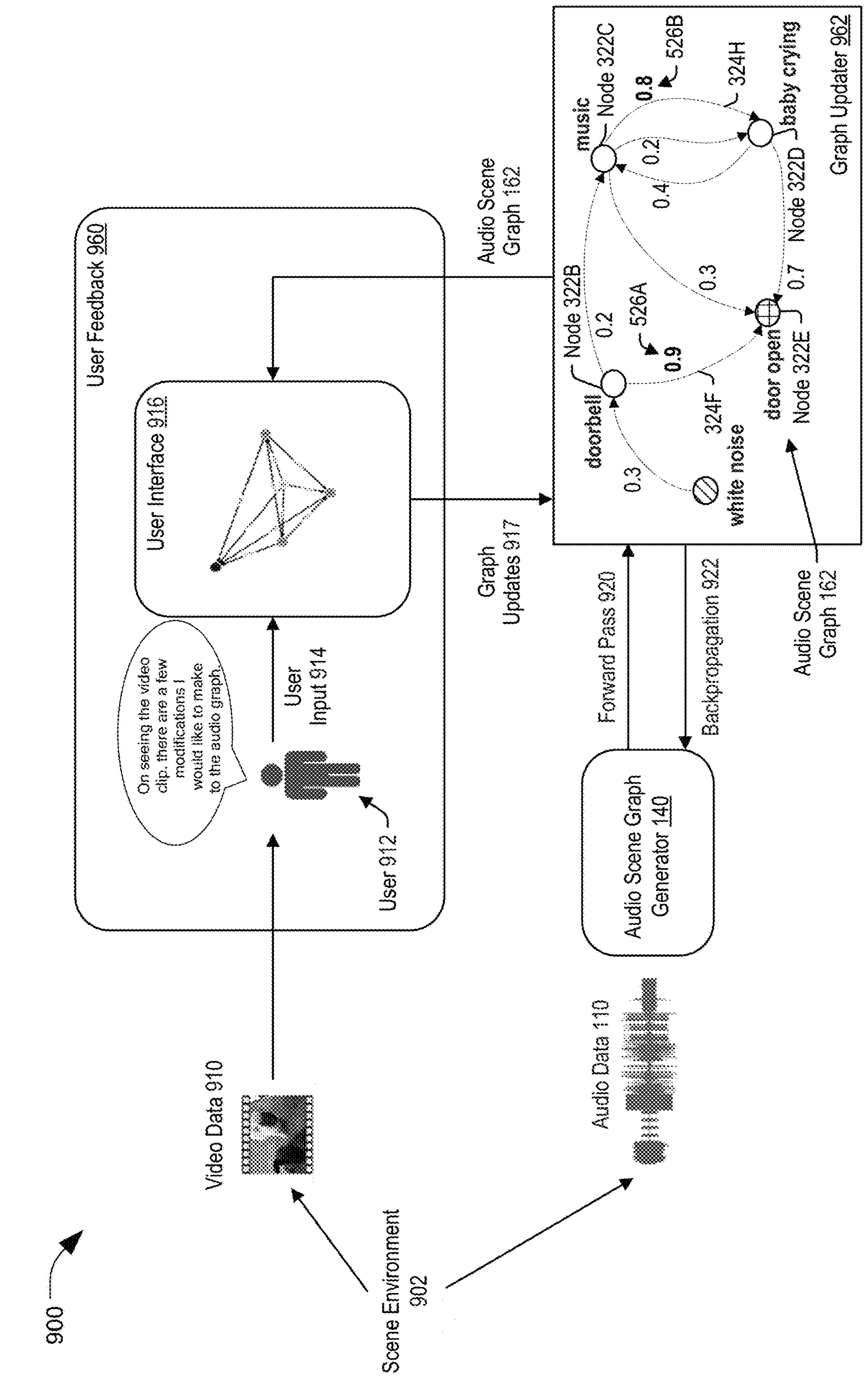
FIG. 9 is a diagram of an illustrative aspect of a system operable to update a knowledge-based audio scene graph, in accordance with some examples of the present disclosure.

Referring to FIG. 9, a particular illustrative aspect of a system configured to update a knowledge-based audio scene graph is disclosed and generally designated 900. In a particular aspect, the system 100 of FIG. 1 includes one or more components of the system 900.

The system 900 includes a graph updater 962 coupled to the audio scene graph generator 140. The graph updater 962 is configured to update the audio scene graph 162 based on user feedback 960. In a particular implementation, the user feedback 960 is based on video data 910 associated with the audio data 110. For example, the audio data 110 and the video data 910 represent a scene environment 902. In a particular aspect, the scene environment 902 corresponds to a physical environment, a virtual environment, or a combination thereof, with the video data 910 corresponding to images of the scene environment 902 and the audio data 110 corresponding to audio of the scene environment 902.

The audio scene graph generator 140 generates the audio scene graph 162 based on the audio data 110, as described with reference to FIG. 1. During a forward pass 920, the audio scene graph generator 140 provides the audio scene graph 162 to the graph updater 962 and the graph updater 962 provides the audio scene graph 162 to a user interface 916. For example, the user interface 916 includes a user device, a display device, a graphical user interface (GUI), or a combination thereof. To illustrate, the graph updater 962 generates a GUI including a representation of the audio scene graph 162 and provides the GUI to a display device.

A user 912 provides a user input 914 indicating graph updates 917 of the audio scene graph 162. In a particular implementation, the user 912 provides the user input 914 responsive to viewing the images represented by the video data 910. The graph updater 962 is configured to update the audio scene graph 162 based on the user input 914, the video data 910, or both. In a first example, the user 912, based on determining that the video data 910 indicates that a second audio event (e.g., a sound of door opening) is strongly related to a first audio event (e.g., a sound of a doorbell), provides the user input 914 indicating an edge weight 526A (e.g., 0.9) for the edge 324F from the node 322B corresponding to the first audio event to the node 322C corresponding to the second audio event. In a second example, the user 912, based on determining that the video data 910 indicates that a second audio event (e.g., baby crying) has a relation to a first audio event (e.g., music) that is not indicated in the audio scene graph 162, provides the user input 914 indicating the relation, an edge weight 526B (e.g., 0.8), a relation tag, or a combination thereof, for a new edge from the node 322C corresponding to the first audio event to the node 322D corresponding to the second audio event. In a third example, the user 912, based on determining that the video data 910 indicates that an audio event (e.g., a sound of car driving by) is associated with a corresponding audio segment, provides the user input 914 indicating that the audio segment is associated with the audio event.

The graph updater 962, in response to receiving the graph updates 917 (e.g., corresponding to the user input 914), updates the audio scene graph 162 based on the graph updates 917. In the first example, the graph updater 962 assigns the edge weight 526A to the edge 324F. In the second example, the graph updater 962 adds an edge 324H from the node 322C to the node 322D, and assigns the edge weight 526B, the relation tag, or both to the edge 324H.

In some implementations, the audio scene graph generator 140 performs backpropagation 922 based on the graph updates 917. For example, the graph updater 962 provides the graph updates 917 to the audio scene graph generator 140. In a particular aspect, the audio scene graph generator 140 updates the knowledge data 122 based on the graph updates 917. In the first example, the audio scene graph generator 140 updates the knowledge data 122 to indicate that a first audio event (e.g., described by the event tag 114B) associated with the node 322B is related to a second audio event (e.g., described by the event tag 114E) associated with the node 322E. In a particular aspect, the audio scene graph generator 140 updates a similarity metric associated with the first audio event (e.g., described by the event tag 114B) and the second audio event (e.g., described by the event tag 114E) to correspond to the edge weight 526A. In the second example, the audio scene graph generator 140 updates the knowledge data 122 to add the relation from a first audio event (e.g., described by the event tag 114C) associated with the node 322C to a second audio event (e.g., described by the event tag 114D). The audio scene graph generator 140 assigns the relation tag to the relation in the knowledge data 122, if indicated by the graph updates 917. In a particular aspect, the audio scene graph generator 140 updates a similarity metric associated with the relation between the first audio event (e.g., described by the event tag 114C) and the second audio event (e.g., described by the event tag 114D) to correspond to the edge weight 526B. In the third example, the audio scene graph generator 140 updates the audio scene segmentor 102 based on the graph updates 917 indicating that an audio event is detected in an audio segment.

The audio scene graph generator 140 uses the updated audio scene segmentor 102, the updated knowledge data 122, the updated similarity metrics, or combination thereof, in subsequent processing of audio data 110. A technical advantage of the backpropagation 922 includes dynamic adjustment of the audio scene graph 162 based on the graph updates 917.

Figure 10:
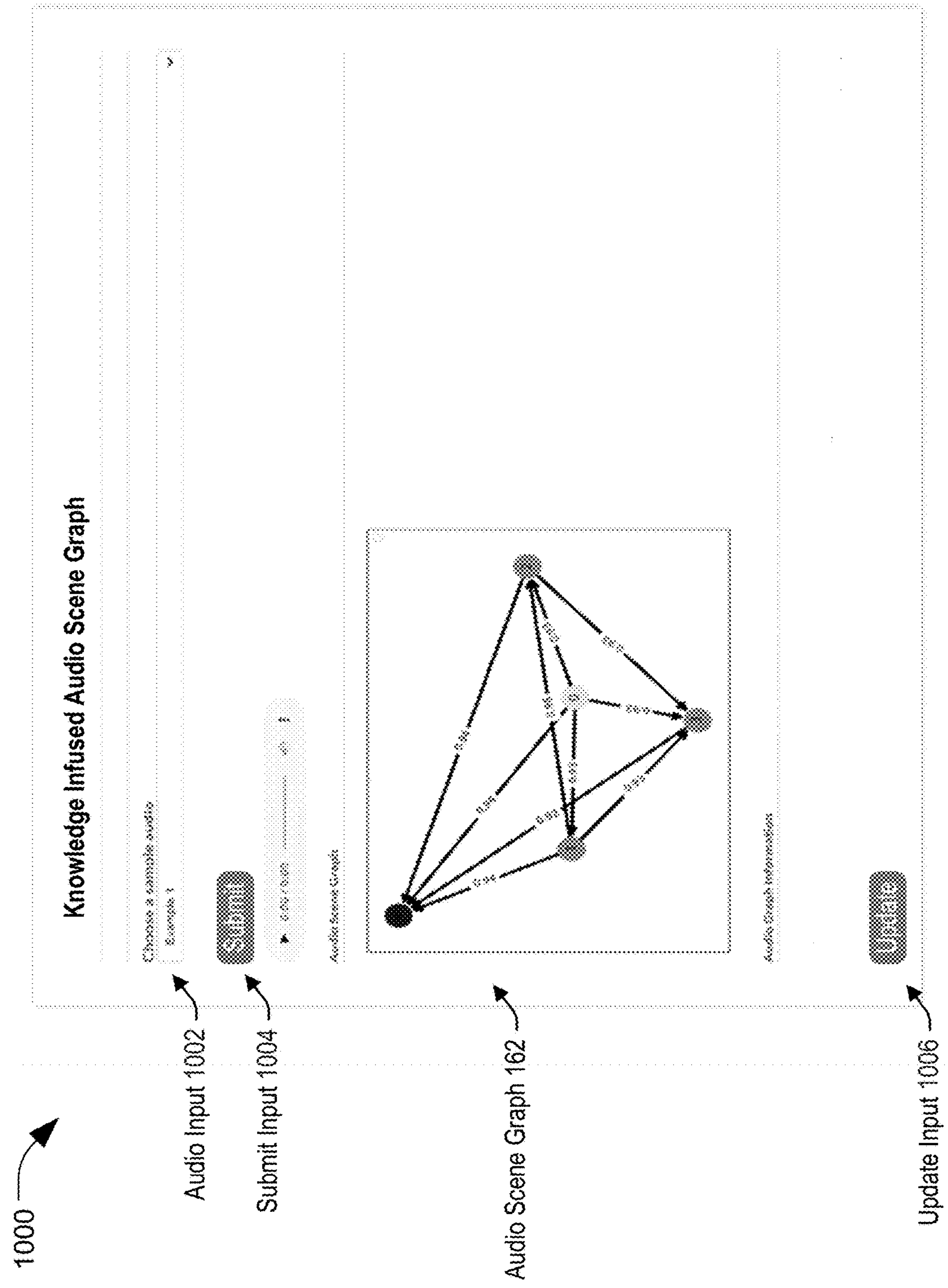
FIG. 10 is a diagram of an illustrative aspect of a graphical user interface (GUI) generated by the system of FIG. 1, the system of FIG. 9, or both, in accordance with some examples of the present disclosure.

FIG. 10 is a diagram of an illustrative aspect of a graphical user interface (GUI) 1000, in accordance with some examples of the present disclosure. In a particular aspect, the GUI 1000 is generated by a GUI generator coupled to the audio scene graph generator 140 of the system 100 of FIG. 1, the system 900 of FIG. 9, or both. In a particular aspect, the graph updater 962 or the user interface 916 of FIG. 9 includes the GUI generator.

The GUI 1000 includes an audio input 1002 and a submit input 1004. The user 912 uses the audio input 1002 to select the audio data 110 and activates the submit input 1004 to provide the audio data 110 to the audio scene graph generator 140. The audio scene graph generator 140, in response to activation of the submit input 1004, generates the audio scene graph 162 based on the audio data 110, as described with reference to FIG. 1.

The GUI generator updates the GUI 1000 to include a representation of the audio scene graph 162. According to some implementations, the GUI 1000 includes an update input 1006. In an example, the user 912 uses the GUI 1000 to update the representation of the audio scene graph 162, such as by adding or updating edge weights, adding or removing edges, adding or updating relation tags, etc. The user 912 activates the update input 1006 to generate the user input 914 corresponding to the updates to the representation of the audio scene graph 162. The graph updater 962 updates the audio scene graph 162 based on the user input 914, as described with reference to FIG. 9. A technical advantage of the GUI 1000 includes user verification, user update, or both, of the audio scene graph 162.

Figure 11:
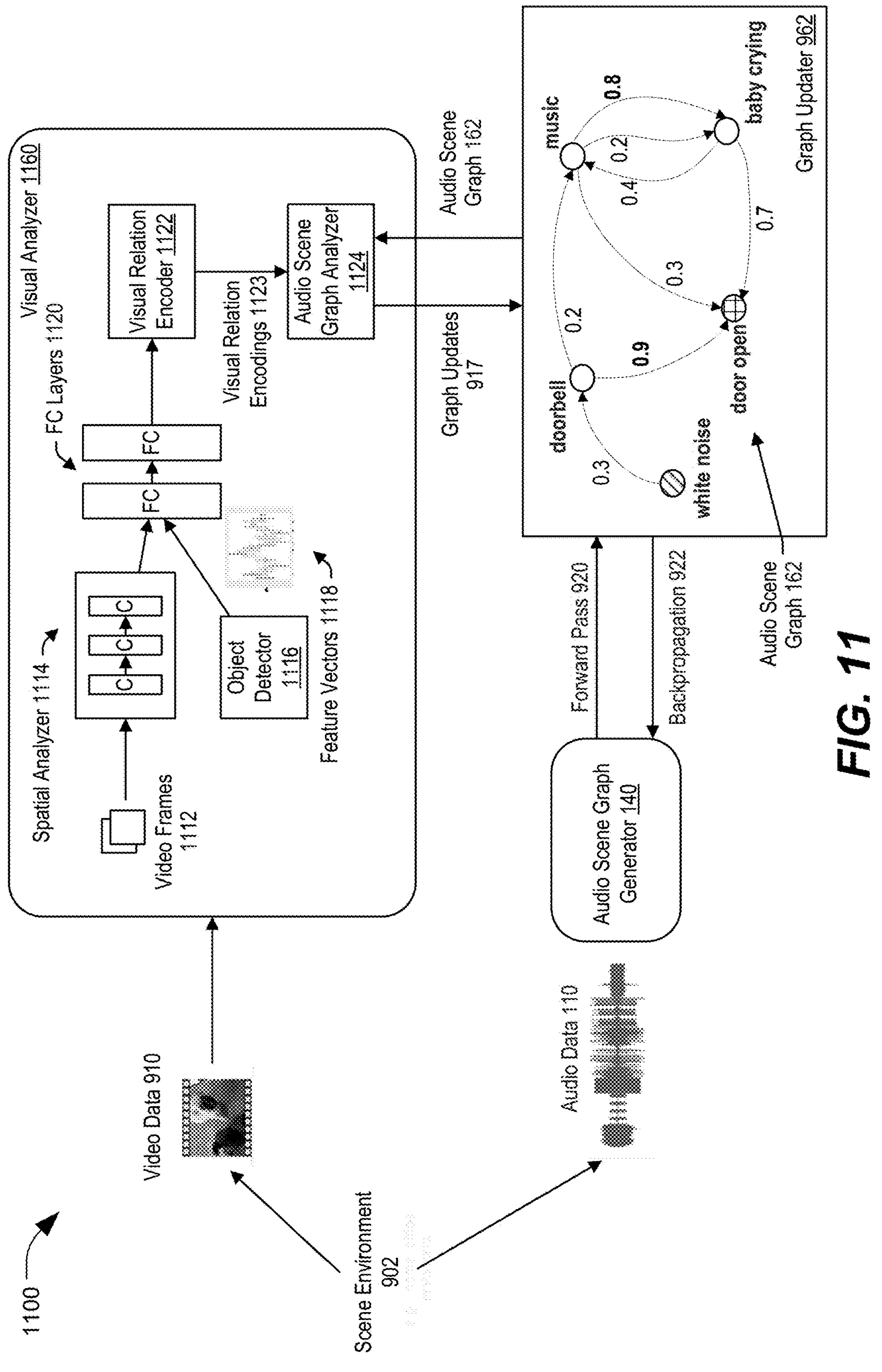
FIG. 11 is a diagram of another illustrative aspect of a system operable to update a knowledge-based audio scene graph, in accordance with some examples of the present disclosure.

Referring to FIG. 11, a particular illustrative aspect of a system configured to update a knowledge-based audio scene graph is disclosed and generally designated 1100. In a particular aspect, the system 100 of FIG. 1 includes one or more components of the system 1100.

The system 1100 includes a visual analyzer 1160 coupled to the graph updater 962. The visual analyzer 1160 is configured to detect visual relations in the video data 910 and to generate the graph updates 917 based on the visual relations to update the audio scene graph 162.

The visual analyzer 1160 includes a spatial analyzer 1114 coupled to fully connected layers 1120 and an object detector 1116 coupled to the fully connected layers 1120. The fully connected layers 1120 are coupled via a visual relation encoder 1122 coupled to an audio scene graph analyzer 1124.

The video data 910 represents video frames 1112. In a particular aspect, the spatial analyzer 1114 uses a plurality of convolution layers (C) to perform spatial mapping across the video frames 1112. The object detector 1116 performs object detection and recognition on the video frames 1112 to generate feature vectors 1118 corresponding to detected objects. In a particular aspect, an output of the spatial analyzer 1114 and the feature vectors 1118 are concatenated to generate an input of the fully connected layers 1120. An output of the fully connected layers 1120 is provided to the visual relation encoder 1122. In a particular aspect, the visual relation encoder 1122 includes a plurality of transformer encoder layers. The visual relation encoder 1122 processes the output of the fully connected layers 1120 to generate visual relation encodings 1123 representing visual relations detected in the video data 910. The audio scene graph analyzer 1124 generates graph updates 917 based on the visual relation encodings 1123 and the audio scene graph 162 (or the encoded graph 172).

In a particular aspect, the audio scene graph analyzer 1124 includes one or more graph transformer layers. In a particular implementation, the audio scene graph analyzer 1124 generates visual node embeddings and visual edge embeddings based on the visual relation encodings 1123, and processes the visual node embeddings, the visual edge embeddings, node embeddings of the encoded graph 172, edge embeddings of the encoded graph 172, or a combination thereof, to generate the graph updates 917. In a particular example, the audio scene graph analyzer 1124 determines, based on the video data 910, that an audio event is detected in a corresponding audio segment, and generates the graph updates 917 to indicate that the audio event is detected in the audio segment. The graph updater 962 updates the audio scene graph 162 based on the graph updates 917, as described with reference to FIG. 9. In a particular aspect, the graph updater 962 performs backpropagation 922 based on the graph updates 917, as described with reference to FIG. 9. A technical advantage of the visual analyzer 1160 includes automatic update of the audio scene graph 162 based on the video data 910.

Figure 12:
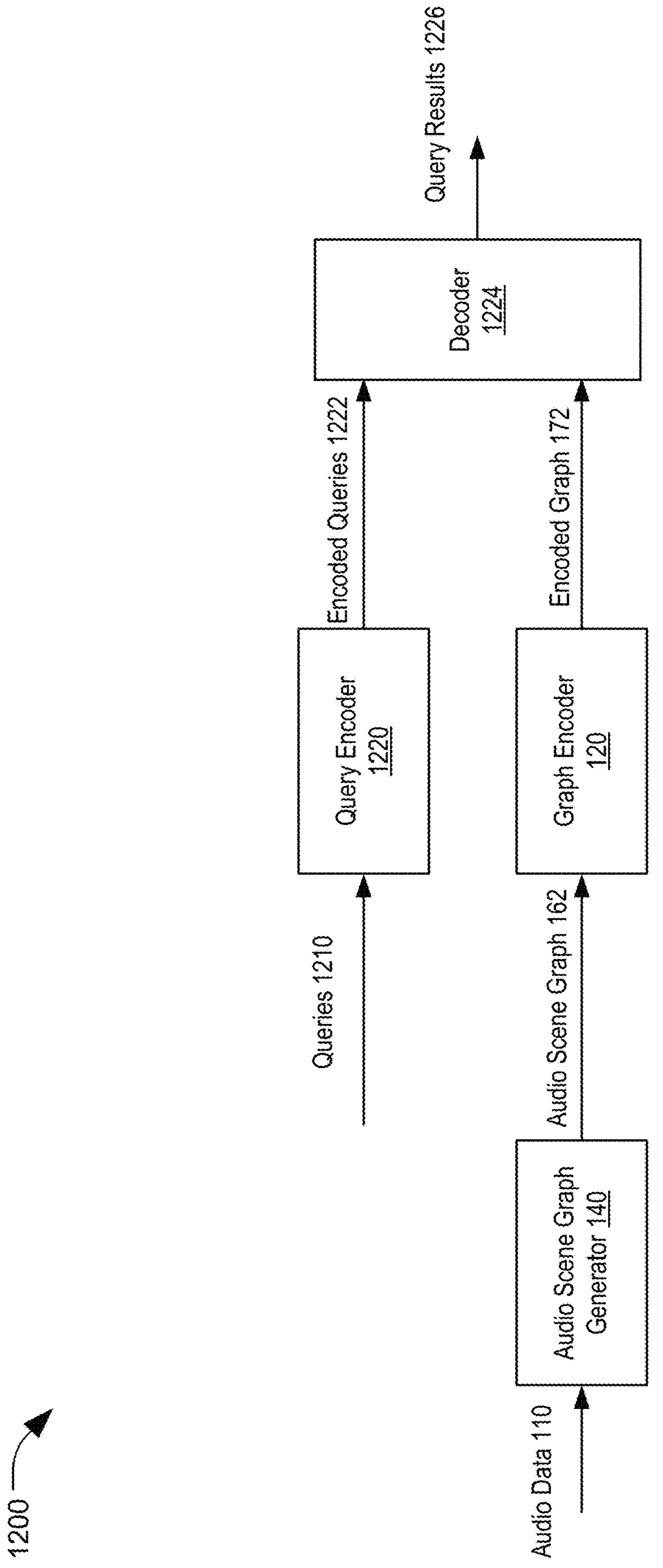
FIG. 12 is a diagram of an illustrative aspect of a system operable to use a knowledge-based audio scene graph to generate query results, in accordance with some examples of the present disclosure.

FIG. 12 is a diagram of an illustrative aspect of a system operable to use the audio scene graph 162 to generate query results 1226, in accordance with some examples of the present disclosure. In a particular aspect, the system 100 of FIG. 1 includes one or more components of the system 1200.

The system 1200 includes a decoder 1224 coupled to a query encoder 1220 and the graph encoder 120. The query encoder 1220 is configured to encode queries 1210 to generate encoded queries 1222. The decoder 1224 is configured to generate query results 1226 based on the encoded queries 1222 and the encoded graph 172. In a particular aspect, a combination (e.g., a concatenation) of the encoded queries 1222 and the encoded graph 172 is provided as an input to the decoder 1224 and the decoder 1224 generates the query results 1226.

It should be understood that using the audio scene graph 162 to generate the query results 1226 is provided as an illustrative example, in other examples the audio scene graph 162 can be used to perform one or more downstream tasks of various types. A technical advantage of using the audio scene graph 162 includes an ability to generate the query results 1226 corresponding to more complex queries 1210 based on the information from the knowledge data 122 that is infused in the audio scene graph 162.

FIG. 13 is a block diagram of an illustrative aspect of a system 1300 operable to generate a knowledge-based audio scene graph, in accordance with some examples of the present disclosure. The system 1300 includes a device 1302, in which one or more processors 1390 include an always-on power domain 1303 and a second power domain 1305, such as an on-demand power domain. In some implementations, a first stage 1340 of a multi-stage system 1320 and a buffer 1360 are configured to operate in an always-on mode, and a second stage 1350 of the multi-stage system 1320 is configured to operate in an on-demand mode.

The always-on power domain 1303 includes the buffer 1360 and the first stage 1340 including a keyword detector 1342. The buffer 1360 is configured to store the audio data 110, the video data 910, or both to be accessible for processing by components of the multi-stage system 1320. In a particular aspect, the device 1302 is coupled to (e.g., includes) a camera 1310, a microphone 1312, or both. In a particular implementation, the microphone 1312 is configured to generate the audio data 110. In a particular implementation, the camera 1310 is configured to generate the video data 910.

The second power domain 1305 includes the second stage 1350 of the multi-stage system 1320 and also includes activation circuitry 1330. The second stage 1350 includes an audio scene graph system 1356 including the audio scene graph generator 140. In some implementations, the audio scene graph system 1356 also includes one or more of the graph encoder 120, the graph updater 962, the user interface 916, the visual analyzer 1160, or the query encoder 1220.

The first stage 1340 of the multi-stage system 1320 is configured to generate at least one of a wakeup signal 1322 or an interrupt 1324 to initiate one or more operations at the second stage 1350. In a particular implementation, the first stage 1340 generates the at least one of the wakeup signal 1322 or the interrupt 1324 in response to the keyword detector 1342 detecting a phrase in the audio data 110 that corresponds to a command to activate the audio scene graph system 1356. In a particular implementation, the first stage 1340 generates the at least one of the wakeup signal 1322 or the interrupt 1324 in response to receiving a user input or a command from another device indicating that the audio scene graph system 1356 is to be activated. In an example, the wakeup signal 1322 is configured to transition the second power domain 1305 from a low-power mode 1332 to an active mode 1334 to activate one or more components of the second stage 1350.

For example, the activation circuitry 1330 may include or be coupled to power management circuitry, clock circuitry, head switch or foot switch circuitry, buffer control circuitry, or any combination thereof. The activation circuitry 1330 may be configured to initiate powering-on of the second stage 1350, such as by selectively applying or raising a voltage of a power supply of the second stage 1350, of the second power domain 1305, or both. As another example, the activation circuitry 1330 may be configured to selectively gate or un-gate a clock signal to the second stage 1350, such as to prevent or enable circuit operation without removing a power supply.

An output 1352 generated by the second stage 1350 of the multi-stage system 1320 is provided to one or more applications 1354. In a particular aspect, the output 1352 includes at least one of the audio scene graph 162, the encoded graph 172, the graph updates 917, the GUI 1000, the encoded queries 1222, or a combination of the encoded queries 1222 and the encoded graph 172. The one or more applications 1354 may be configured to perform one or more downstream tasks based on the output 1352. To illustrate, the one or more applications 1354 may include the decoder 1224, a voice interface application, an integrated assistant application, a vehicle navigation and entertainment application, or a home automation system, as illustrative, non-limiting examples.

By selectively activating the second stage 1350 based on a user input, a command, or a result of processing the audio data 110 at the first stage 1340 of the multi-stage system 1320, overall power consumption associated with generating a knowledge-based audio scene graph may be reduced.

Figure 14:
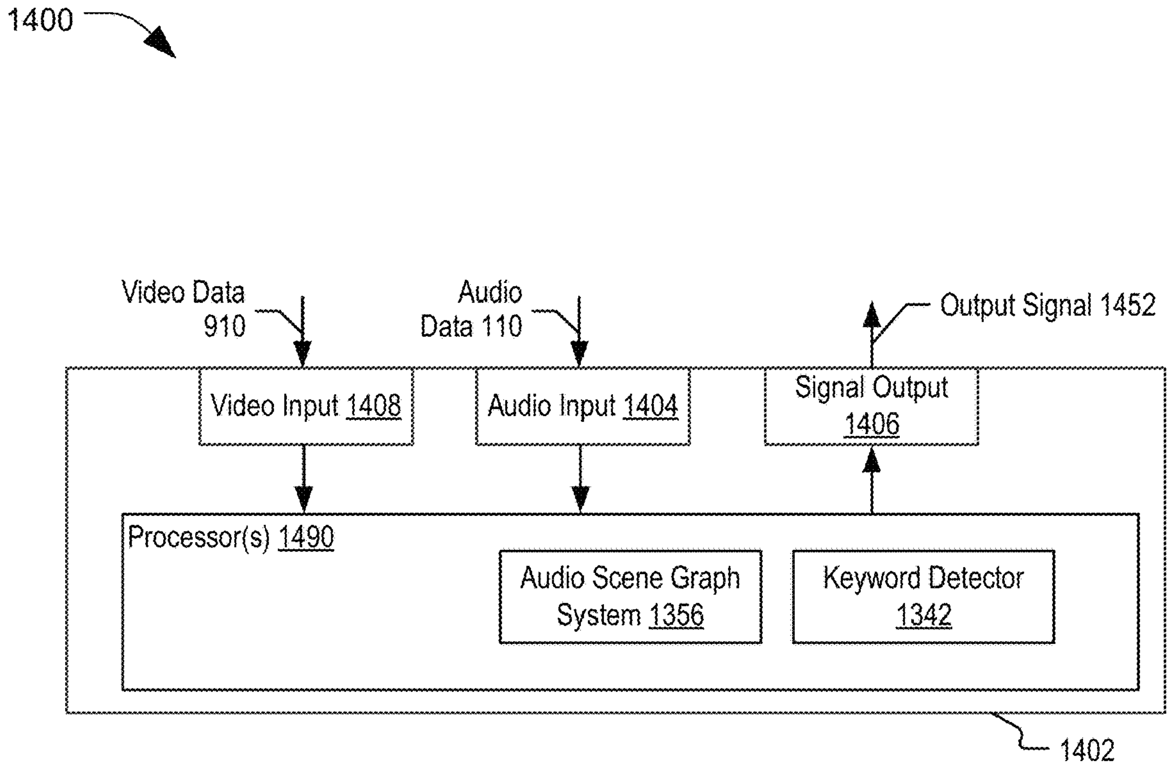
FIG. 14 illustrates an example of an integrated circuit operable to generate a knowledge-based audio scene graph, in accordance with some examples of the present disclosure.

FIG. 14 depicts an implementation 1400 of an integrated circuit 1402 that includes one or more processors 1490. The one or more processors 1490 include the audio scene graph system 1356. In some implementations, the one or more processors 1490 also include the keyword detector 1342.

The integrated circuit 1402 includes an audio input 1404, such as one or more bus interfaces, to enable the audio data 110 to be received for processing. The integrated circuit 1402 also includes a video input 1408, such as one or more bus interfaces, to enable the video data 910 to be received for processing. The integrated circuit 1402 further includes a signal output 1406, such as a bus interface, to enable sending of an output signal 1452, such as the audio scene graph 162, the encoded graph 172, the graph updates 917, the encoded queries 1222, a combination of the encoded graph 172 and the encoded queries 1222, the query results 1226, or a combination thereof.

Figure 15:
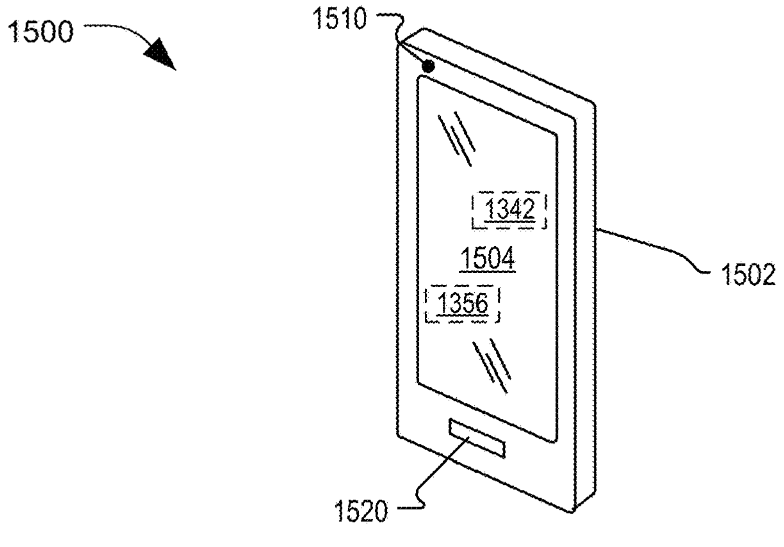
FIG. 15 is a diagram of a mobile device operable to generate a knowledge-based audio scene graph, in accordance with some examples of the present disclosure.
Figure 16:
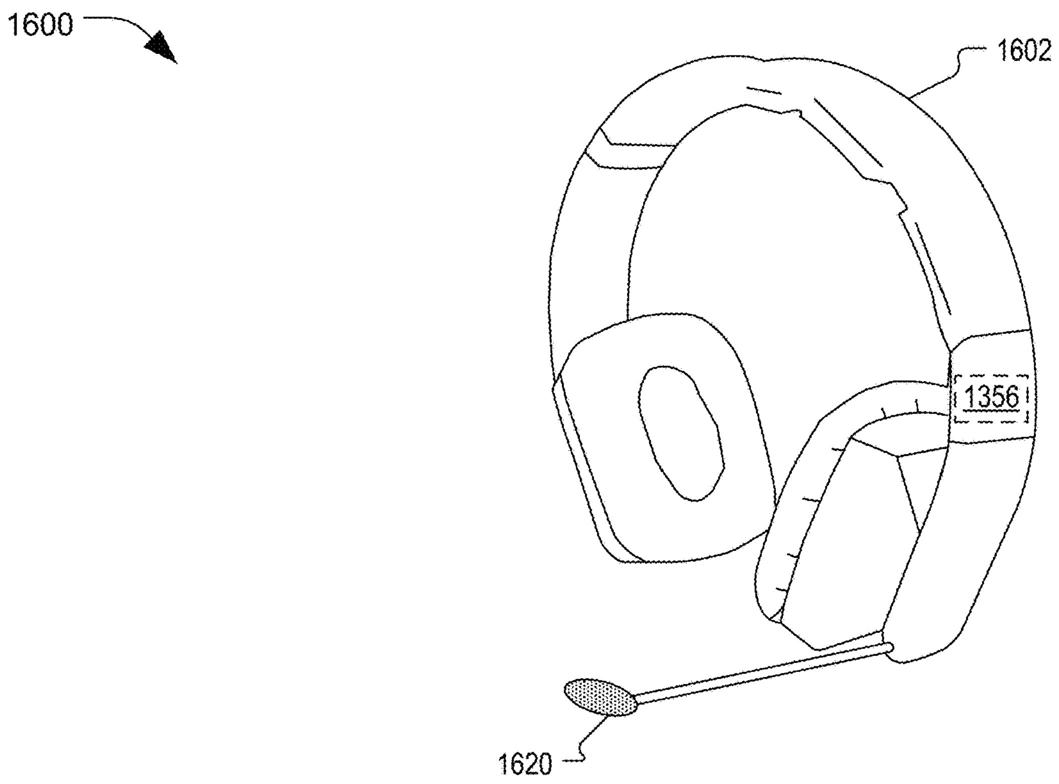
FIG. 16 is a diagram of a headset operable to generate a knowledge-based audio scene graph, in accordance with some examples of the present disclosure.
Figure 17:
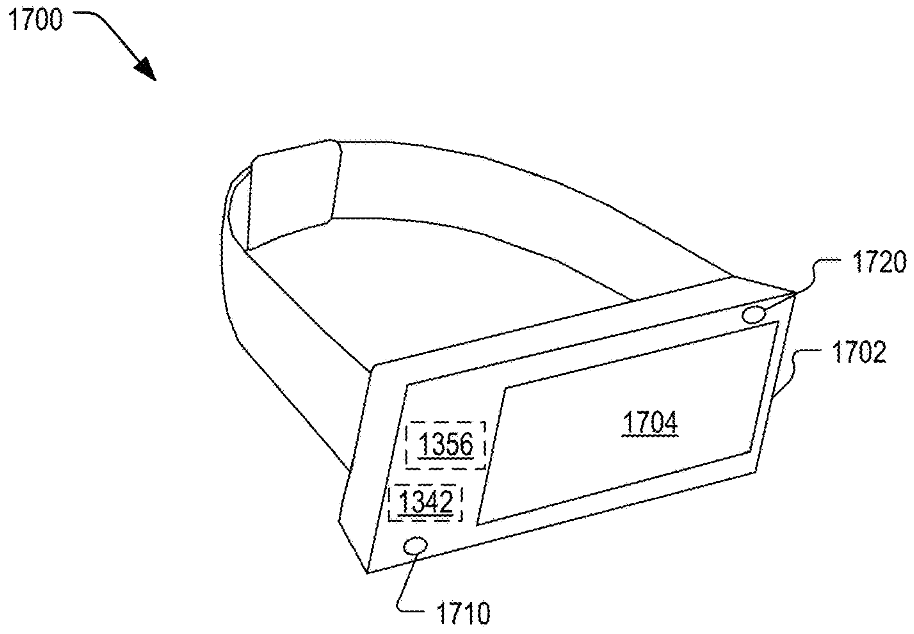
FIG. 17 is a diagram of a wearable electronic device operable to generate a knowledge-based audio scene graph, in accordance with some examples of the present disclosure.
Figure 18:
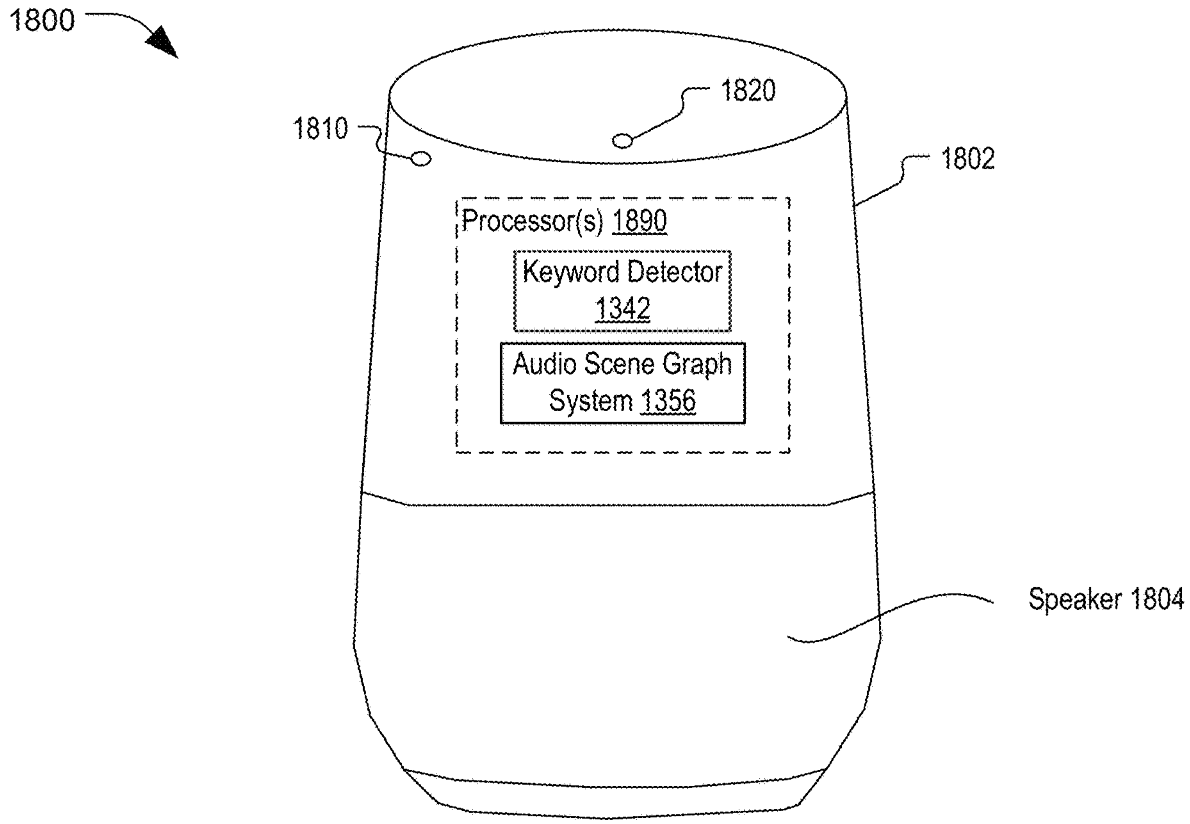
FIG. 18 is a diagram of a voice-controlled speaker system operable to generate a knowledge-based audio scene graph, in accordance with some examples of the present disclosure.
Figure 19:
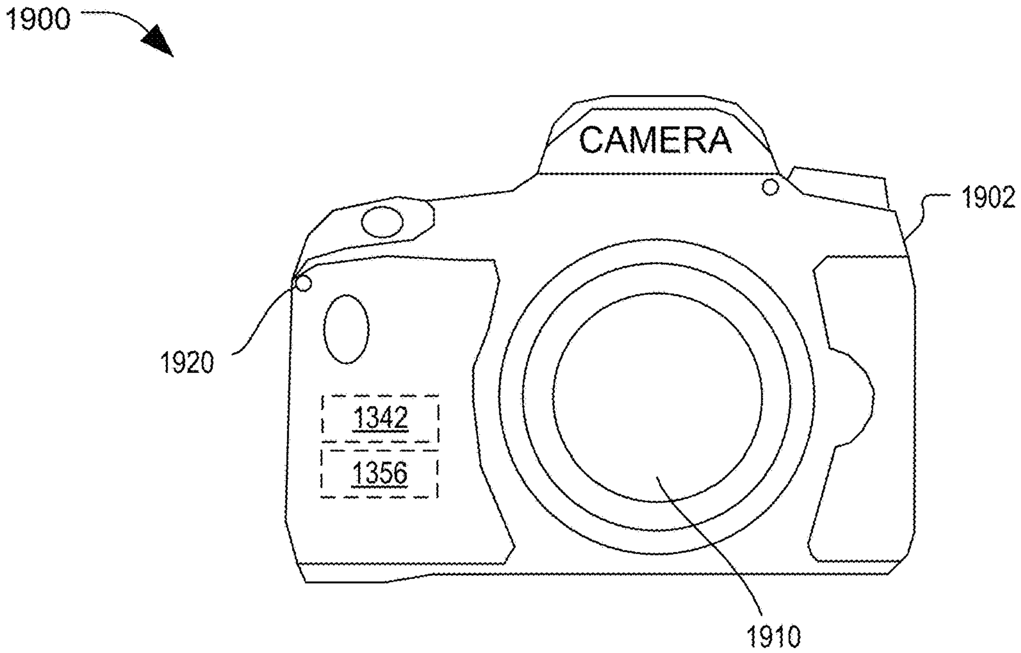
FIG. 19 is a diagram of a camera operable to generate a knowledge-based audio scene graph, in accordance with some examples of the present disclosure.
Figure 20:
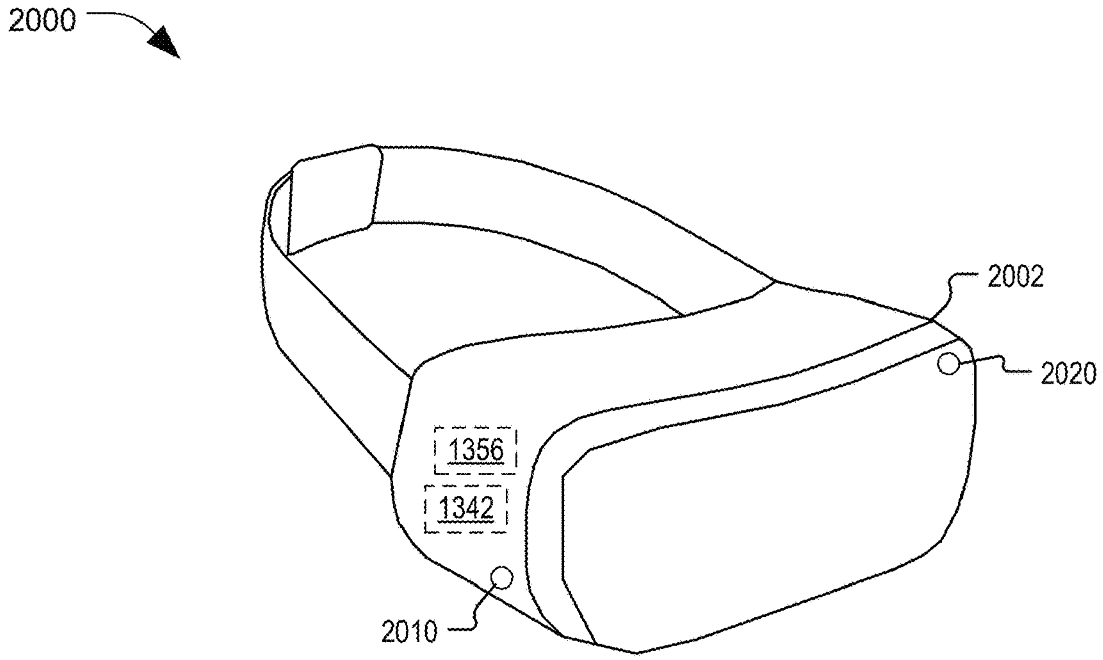
FIG. 20 is a diagram of a headset, such as a virtual reality, mixed reality, or augmented reality headset, operable to generate a knowledge-based audio scene graph, in accordance with some examples of the present disclosure.
Figure 21:
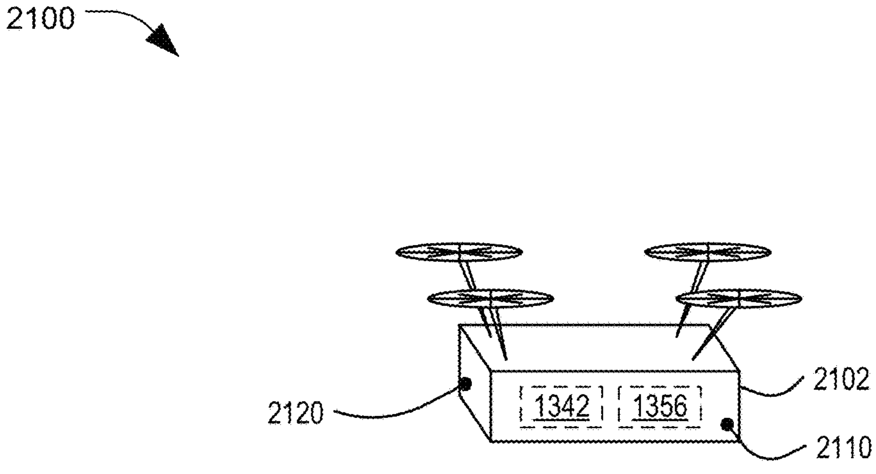
FIG. 21 is a diagram of a first example of a vehicle operable to generate a knowledge-based audio scene graph, in accordance with some examples of the present disclosure.
Figure 22:
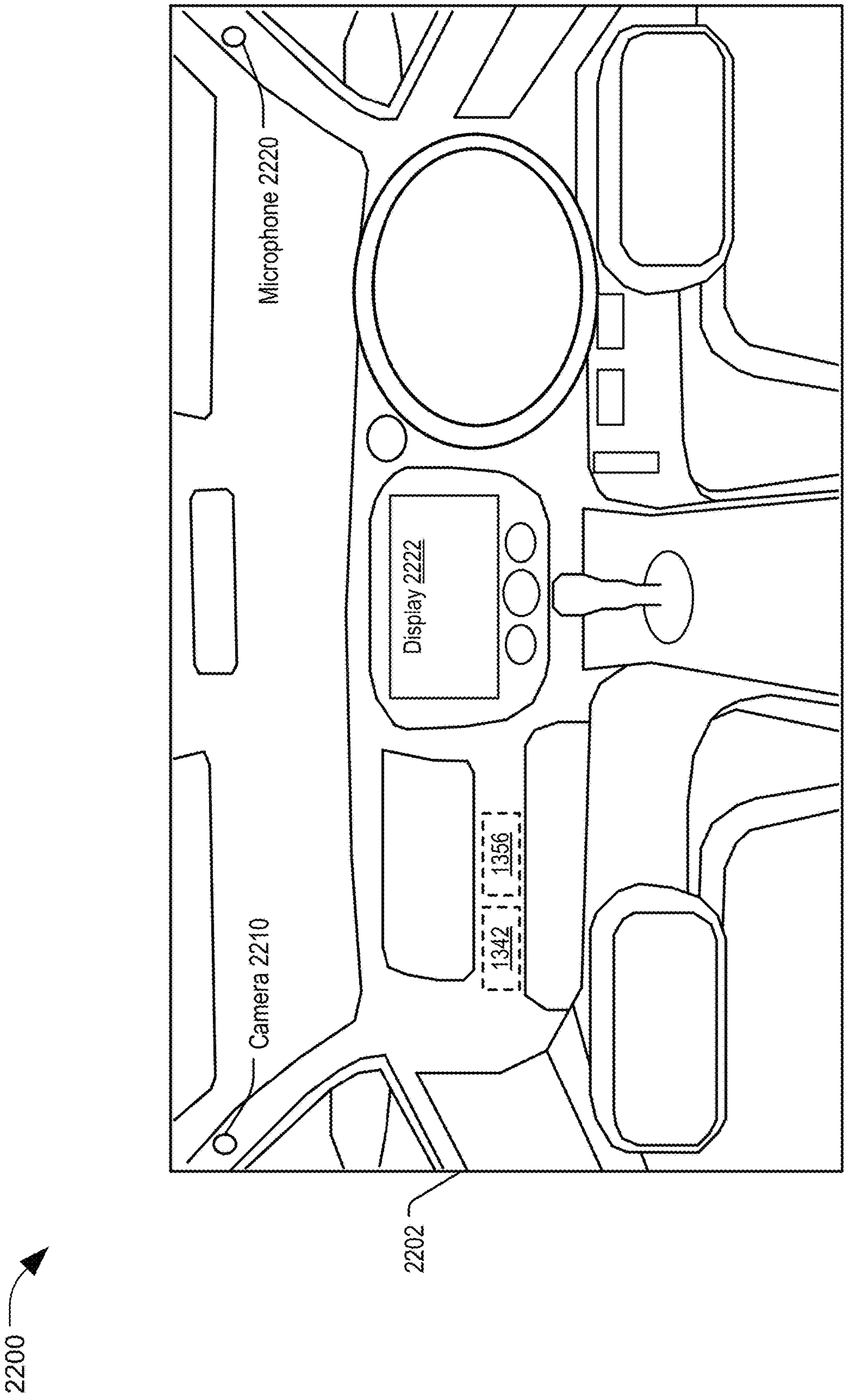
FIG. 22 is a diagram of a second example of a vehicle operable to generate a knowledge-based audio scene graph, in accordance with some examples of the present disclosure.

The integrated circuit 1402 enables implementation of the audio scene graph system 1356 as a component in a system that includes microphones, such as a mobile phone or tablet as depicted in FIG. 15, a headset as depicted in FIG. 16, a wearable electronic device as depicted in FIG. 17, a voice-controlled speaker system as depicted in FIG. 18, a camera device as depicted in FIG. 19, a virtual reality, mixed reality, or augmented reality headset as depicted in FIG. 20, or a vehicle as depicted in FIG. 21 or FIG. 22.

FIG. 15 depicts an implementation 1500 of a mobile device 1502, such as a phone or tablet, as illustrative, non-limiting examples. The mobile device 1502 includes a camera 1510, a microphone 1520, and a display screen 1504. Components of the one or more processors 1490, including the audio scene graph system 1356, the keyword detector 1342, or both, are integrated in the mobile device 1502 and are illustrated using dashed lines to indicate internal components that are not generally visible to a user of the mobile device 1502. In a particular example, the keyword detector 1342 operates to detect user voice activity, which is then processed to perform one or more operations at the mobile device 1502, such as to launch a graphical user interface or otherwise display other information associated with the user's speech at the display screen 1504 (e.g., via an integrated "smart assistant" application). In an illustrative example, the audio scene graph generator 140 is activated to generate an audio scene graph 162 responsive to the keyword detector 1342 detecting a particular phrase. In a particular aspect, the audio scene graph system 1356 uses the decoder 1224 to generate query results 1226 indicating which application is likely to be useful to the user and activates the application indicated in the query results 1226.

FIG. 16 depicts an implementation 1600 of a headset device 1602. The headset device 1602 includes a microphone 1620. Components of the one or more processors 1490, including the audio scene graph system 1356, are integrated in the headset device 1602. In a particular example, the audio scene graph system 1356 operates to detect user voice activity, which is then processed to perform one or more operations at the headset device 1602, such as to generate the audio scene graph 162, to perform one or more downstream tasks based on the audio scene graph 162, to transmit the audio scene graph 162 to a second device (not shown) for further processing, or a combination thereof.

FIG. 17 depicts an implementation 1700 of a wearable electronic device 1702, illustrated as a "smart watch." The audio scene graph system 1356, the keyword detector 1342, a camera 1710, a microphone 1720, or a combination thereof, are integrated into the wearable electronic device 1702. In a particular example, the keyword detector 1342 operates to detect user voice activity, which is then processed to perform one or more operations at the wearable electronic device 1702, such as to launch a graphical user interface or otherwise display other information associated with the user's speech at a display screen 1704 of the wearable electronic device 1702. To illustrate, the display screen 1704 may be configured to display a notification based on user speech detected by the wearable electronic device 1702. In a particular example, the wearable electronic device 1702 includes a haptic device that provides a haptic notification (e.g., vibrates) in response to detection of user voice activity. For example, the haptic notification can cause a user to look at the wearable electronic device 1702 to see a displayed notification indicating detection of a keyword spoken by the user. The wearable electronic device 1702 can thus alert a user with a hearing impairment or a user wearing a headset that the user's voice activity is detected. In a particular aspect, the audio scene graph system 1356 generates the audio scene graph 162 responsive to the keyword detector 1342 detecting a particular phrase in the user voice activity, and uses the audio scene graph 162 to perform one or more downstream tasks.

FIG. 18 is an implementation 1800 of a wireless speaker and voice activated device 1802. The wireless speaker and voice activated device 1802 can have wireless network connectivity and is configured to execute an assistant operation. A camera 1810, a microphone 1820, and one or more processors 1890 including the audio scene graph system 1356 and the keyword detector 1342, are included in the wireless speaker and voice activated device 1802. The wireless speaker and voice activated device 1802 also includes a speaker 1804. During operation, in response to receiving a verbal command identified as user speech via operation of the keyword detector 1342, the wireless speaker and voice activated device 1802 can execute assistant operations, such as via execution of the voice activation system (e.g., an integrated assistant application). The assistant operations can include adjusting a temperature, playing music, turning on lights, etc. For example, the assistant operations are performed responsive to receiving a command after a keyword or key phrase (e.g., "hello assistant"). In a particular aspect, the audio scene graph system 1356 generates the audio scene graph 162 responsive to the keyword detector 1342 detecting a particular phrase in the user voice activity, and uses the audio scene graph 162 to perform one or more downstream tasks, such as generating query results 1226.

FIG. 19 depicts an implementation 1900 of a portable electronic device that corresponds to a camera device 1902. The audio scene graph system 1356, the keyword detector 1342, an image sensor 1910, a microphone 1920, or a combination thereof, are included in the camera device 1902. During operation, in response to receiving a verbal command identified as user speech via operation of the keyword detector 1342, the camera device 1902 can execute operations responsive to spoken user commands, such as to adjust image or video capture settings, image or video playback settings, or image or video capture instructions, as illustrative examples. In a particular aspect, the audio scene graph system 1356 generates the audio scene graph 162 responsive to the keyword detector 1342 detecting a particular phrase in the user voice activity, and uses the audio scene graph 162 to perform one or more downstream tasks, such as adjusting camera settings based on the detected audio scene.

FIG. 20 depicts an implementation 2000 of a portable electronic device that corresponds to a virtual reality, mixed reality, or augmented reality headset 2002. For example, the headset 2002 corresponds to an extended reality headset. The audio scene graph system 1356, the keyword detector 1342, a camera 2010, a microphone 2020, or a combination thereof, are integrated into the headset 2002. In a particular aspect, the headset 2002 includes the microphone 2020 to capture speech of a user, environmental sounds, or a combination thereof. The keyword detector 1342 can perform user voice activity detection based on audio signals received from the microphone 2020 of the headset 2002. A visual interface device is positioned in front of the user's eyes to enable display of augmented reality, mixed reality, or virtual reality images or scenes to the user while the headset 2002 is worn. In a particular example, the visual interface device is configured to display a notification indicating user speech detected in the audio signal. In a particular aspect, the audio scene graph system 1356 generates the audio scene graph 162 responsive to the keyword detector 1342 detecting a particular phrase in the user voice activity, and uses the audio scene graph 162 to perform one or more downstream tasks.

FIG. 21 depicts an implementation 2100 of a vehicle 2102, illustrated as a manned or unmanned aerial device (e.g., a package delivery drone). The keyword detector 1342, the audio scene graph system 1356, a camera 2110, a microphone 2120, or a combination thereof, are integrated into the vehicle 2102. The keyword detector 1342 can perform user voice activity detection based on audio signals received from the microphone 2120 of the vehicle 2102, such as for delivery instructions from an authorized user of the vehicle 2102. In a particular aspect, the audio scene graph system 1356 generates the audio scene graph 162 responsive to the keyword detector 1342 detecting a particular phrase in the user voice activity, and uses the audio scene graph 162 to perform one or more downstream tasks, such as generating query results 1226.

FIG. 22 depicts another implementation 2200 of a vehicle 2202, illustrated as a car. The vehicle 2202 includes the one or more processors 1490 including the audio scene graph system 1356, the keyword detector 1342, or both. The vehicle 2202 also includes a camera 2210, a microphone 2220, or both. The microphone 2220 is positioned to capture utterances of an operator of the vehicle 2202. The keyword detector 1342 can perform user voice activity detection based on audio signals received from the microphone 2220 of the vehicle 2202.

In some implementations, user voice activity detection can be performed based on an audio signal received from interior microphones (e.g., the microphone 2220), such as for a voice command from an authorized passenger. For example, the user voice activity detection can be used to detect a voice command from an operator of the vehicle 2202 (e.g., from a parent to set a volume to 5 or to set a destination for a self-driving vehicle) and to disregard the voice of another passenger (e.g., a voice command from a child to set the volume to 10 or other passengers discussing another location). In some implementations, user voice activity detection can be performed based on an audio signal received from external microphones (e.g., the microphone 2220), such as an authorized user of the vehicle.

In a particular implementation, in response to receiving a verbal command identified as user speech via operation of the keyword detector 1342, a voice activation system initiates one or more operations of the vehicle 2202 based on one or more keywords (e.g., "unlock," "start engine," "play music," "display weather forecast," or another voice command) detected in a microphone signal, such as by providing feedback or information via a display 2222 or one or more speakers. In a particular aspect, the audio scene graph system 1356 generates the audio scene graph 162 responsive to the keyword detector 1342 detecting a particular phrase in the user voice activity, and uses the audio scene graph 162 to perform one or more downstream tasks, such as generating query results 1226.

Figure 23:
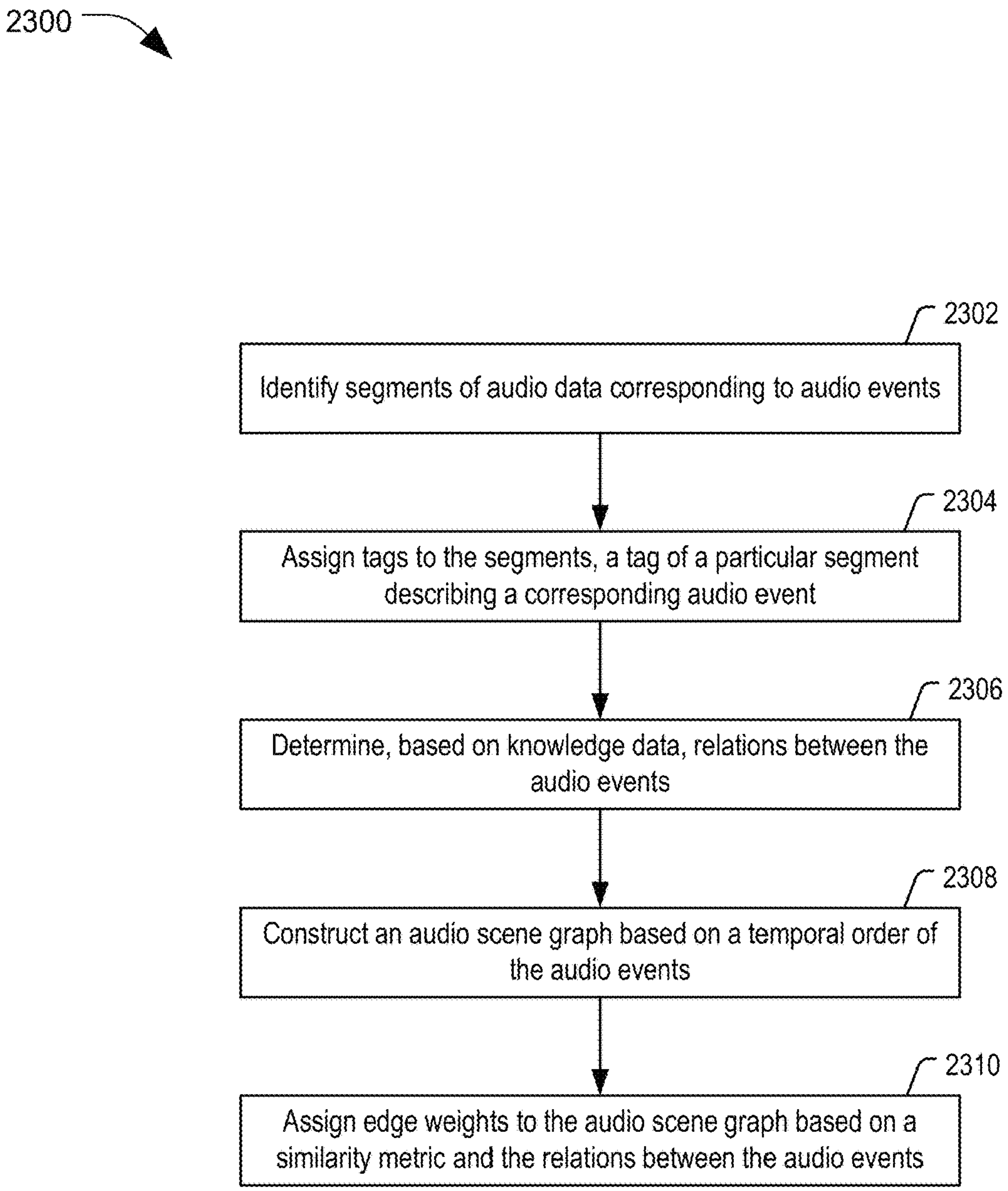
FIG. 23 is a diagram of a particular implementation of a method of generating a knowledge-based audio scene graph that may be performed by the system of FIG. 1, in accordance with some examples of the present disclosure.

Referring to FIG. 23, a particular implementation of a method 2300 of generating a knowledge-based audio scene graph is shown. In a particular aspect, one or more operations of the method 2300 are performed by at least one of the audio scene segmentor 102, the audio scene graph constructor 104, the knowledge data analyzer 108, the event representation generator 106, the audio scene graph updater 118, the audio scene graph generator 140, the system 100 of FIG. 1, the event audio representation generator 422, the event tag representation generator 424, the combiner 426 of FIG. 4, the overall edge weight generator 510 of FIG. 5, the event pair text representation generator 610, the relation text embedding generator 612, the relation similarity metric generator 614, the edge weights generator 616 of FIG. 6, the positional encoding generator 750, the graph transformer 770, the input generator 772, the one or more graph transformer layers 774 of FIG. 7, the audio scene graph system 1356, the second stage 1350, the second power domain 1305, the one or more processors 1390, the device 1302, the system 1300 of FIG. 13, the one or more processors 1490, the integrated circuit 1402 of FIG. 14, the mobile device 1502 of FIG. 15, the headset device 1602 of FIG. 16, the wearable electronic device 1702 of FIG. 17, the wireless speaker and voice activated device 1802 of FIG. 18, the camera device 1902 of FIG. 19, the headset 2002 of FIG. 20, the vehicle 2102 of FIG. 21, the vehicle 2202 of FIG. 22, or a combination thereof.

The method 2300 includes identifying segments of audio data corresponding to audio events, at 2302. For example, the audio scene segmentor 102 of FIG. 1 identifies the audio segments 112 of the audio data 110 corresponding to audio events, as described with reference to FIGS. 1 and 2.

The method 2300 also includes assigning tags to the segments, at 2304. For example, the audio scene segmentor 102 of FIG. 1 assigns the event tags 114 to the audio segments 112, as described with reference to FIGS. 1 and 2. An event tag 114 of a particular audio segment 112 describes a corresponding audio event.

The method 2300 further includes determining, based on knowledge data, relations between the audio events, at 2306. For example, the knowledge data analyzer 108 generates, based on the knowledge data 122, the event pair relation data 152 indicating relations between the audio events, as described with reference to FIGS. 1, 5A, and 6A.

The method 2300 also includes constructing an audio scene graph based on a temporal order of the audio events, at 2308. For example, the audio scene graph constructor 104 of FIG. 1 constructs the audio scene graph 162 based on the audio segment temporal order 164 of the audio segments 112 corresponding to the audio events, as described with reference to FIGS. 1 and 3.

The method 2300 further includes assigning edge weights to the audio scene graph based on a similarity metric and the relations between the audio events, at 2310. For example, the audio scene graph updater 118 assigns the edge weights 526 to the audio scene graph 162 based on the overall edge weight 528 corresponding to a similarity metric between the audio events, and the relations between the audio events indicated by the event pair relation data 152, as described with reference to FIGS. 5B and 6B.

A technical advantage of the method 2300 includes generation of a knowledge-based audio scene graph 162. The audio scene graph 162 can be used to perform various types of analysis of an audio scene represented by the audio scene graph 162. For example, the audio scene graph 162 can be used to generate responses to queries, initiate one or more actions, or a combination thereof.

The method 2300 of FIG. 23 may be implemented by a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method 2300 of FIG. 23 may be performed by a processor that executes instructions, such as described with reference to FIG. 24.

Figure 24:
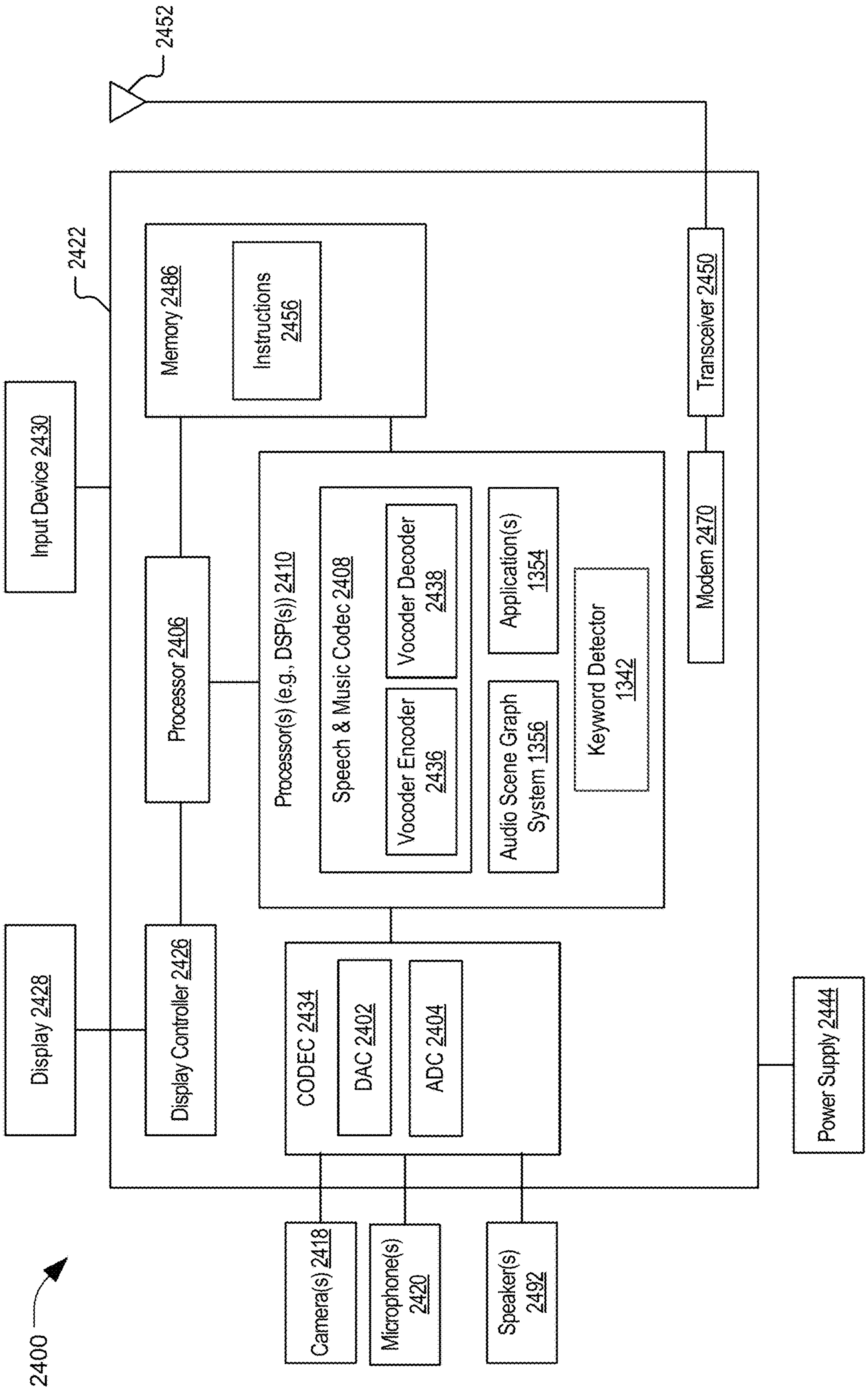
FIG. 24 is a block diagram of a particular illustrative example of a device that is operable to generate a knowledge-based audio scene graph, in accordance with some examples of the present disclosure.

Referring to FIG. 24, a block diagram of a particular illustrative implementation of a device is depicted and generally designated 2400. In various implementations, the device 2400 may have more or fewer components than illustrated in FIG. 24. In an illustrative implementation, the device 2400 may correspond to the device 1302 of FIG. 13, a device including the integrated circuit 1402 of FIG. 14, the mobile device 1502 of FIG. 15, the headset device 1602 of FIG. 16, the wearable electronic device 1702 of FIG. 17, the wireless speaker and voice activated device 1802 of FIG. 18, the camera device 1902 of FIG. 19, the headset 2002 of FIG. 20, the vehicle 2102 of FIG. 21, the vehicle 2202 of FIG. 22, or a combination thereof. In an illustrative implementation, the device 2400 may perform one or more operations described with reference to FIGS. 1-23.

In a particular implementation, the device 2400 includes a processor 2406 (e.g., a CPU). The device 2400 may include one or more additional processors 2410 (e.g., one or more DSPs). In a particular aspect, the one or more processors 1390 of FIG. 13, the one or more processors 1490 of FIG. 14, the one or more processors 1890 of FIG. 18, or a combination thereof correspond to the processor 2406, the processors 2410, or a combination thereof. The processors 2410 may include a speech and music coder-decoder (CODEC) 2408 that includes a voice coder ("vocoder") encoder 2436, a vocoder decoder 2438, or both. The processors 2410 includes the audio scene graph system 1356, the keyword detector 1342, the one or more applications 1354, or a combination thereof.

The device 2400 may include a memory 2486 and a CODEC 2434. The memory 2486 may include instructions 2456, that are executable by the one or more additional processors 2410 (or the processor 2406) to implement the functionality described with reference to the audio scene graph system 1356, the keyword detector 1342, the one or more applications 1354, or a combination thereof. In a particular aspect, the memory 2486 is configured to store data used or generated by the audio scene graph system 1356, the keyword detector 1342, the one or more applications 1354, or a combination thereof. In an example, the memory 2486 is configured to store the audio data 110, the knowledge data 122, the audio segments 112, the event tags 114, the audio segment temporal order 164, the audio scene graph 162, the event representations 146, the event pair relation data 152, the encoded graph 172 of FIG. 1, the audio embedding 432, the text embedding 434 of FIG. 4, the overall edge weight 528, the edge weights 526 of FIG. 5B, the relation tags 624 of FIG. 6A, the relation text embeddings 644, the event pair text embedding 634, the relation similarity metrics 654 of FIG. 6B, the Laplacian positional encodings 752, the temporal positions 754, the positional encodings 756, the node embeddings 782, the edge embeddings 784 of FIG. 7, the inputs and outputs of FIG. 8, the user input 914, the graph updates 917, the video data 910 of FIG. 9, the GUI 1000 of FIG. 10, the video frames 1112, the feature vectors 1118, the visual relation encodings 1123 of FIG. 11, the queries 1210, the encoded queries 1222, the query results 1226 of FIG. 12, the output 1352 of FIG. 13, or a combination thereof. The device 2400 may include a modem 2470 coupled, via a transceiver 2450, to an antenna 2452.

The device 2400 may include a display 2428 coupled to a display controller 2426. One or more speakers 2492, one or more microphones 2420, one or more cameras 2418, or a combination thereof, may be coupled to the CODEC 2434. The CODEC 2434 may include a digital-to-analog converter (DAC) 2402, an analog-to-digital converter (ADC) 2404, or both. In a particular implementation, the CODEC 2434 may receive analog signals from the one or more microphones 2420, convert the analog signals to digital signals using the analog-to-digital converter 2404, and provide the digital signals to the speech and music codec 2408. The speech and music codec 2408 may process the digital signals, and the digital signals may further be processed by the audio scene graph system 1356, the keyword detector 1342, the one or more applications 1354, or a combination thereof. In a particular implementation, the speech and music codec 2408 may provide digital signals to the CODEC 2434. The CODEC 2434 may convert the digital signals to analog signals using the digital-to-analog converter 2402 and may provide the analog signals to the one or more speakers 2492.

In a particular aspect, the one or more microphones 2420 are configured to generate the audio data 110. In a particular aspect, the one or more cameras 2418 are configured to generate the video data 910 of FIG. 9. In a particular aspect, the one or more microphones 2420 include the microphone 1312 of FIG. 13, the microphone 1520 of FIG. 15, the microphone 1620 of FIG. 16, the microphone 1720 of FIG. 17, the microphone 1820 of FIG. 18, the microphone 1920 of FIG. 19, the microphone 2020 of FIG. 20, the microphone 2120 of FIG. 21, the microphone 2220 of FIG. 22, or a combination thereof. In a particular aspect, the one or more cameras 2418 include the camera 1310 of FIG. 13, the camera 1510 of FIG. 15, the camera 1710 of FIG. 17, the camera 1810 of FIG. 18, the image sensor 1910 of FIG. 19, the camera 2010 of FIG. 20, the camera 2110 of FIG. 21, the camera 2210 of FIG. 22, or a combination thereof.

In a particular implementation, the device 2400 may be included in a system-in-package or system-on-chip device 2422. In a particular implementation, the memory 2486, the processor 2406, the processors 2410, the display controller 2426, the CODEC 2434, and the modem 2470 are included in the system-in-package or system-on-chip device 2422. In a particular implementation, an input device 2430 and a power supply 2444 are coupled to the system-in-package or the system-on-chip device 2422. Moreover, in a particular implementation, as illustrated in FIG. 24, the display 2428, the input device 2430, the one or more speakers 2492, the one or more cameras 2418, the one or more microphones 2420, the antenna 2452, and the power supply 2444 are external to the system-in-package or the system-on-chip device 2422. In a particular implementation, each of the display 2428, the input device 2430, the one or more speakers 2492, the one or more cameras 2418, the one or more microphones 2420, the antenna 2452, and the power supply 2444 may be coupled to a component of the system-in-package or the system-on-chip device 2422, such as an interface or a controller.

The device 2400 may include a smart speaker, a speaker bar, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a headset, an augmented reality headset, a mixed reality headset, a virtual reality headset, an extended reality (XR) headset, an XR device, a mobile phone, an aerial vehicle, a home automation system, a voice-activated device, a wireless speaker and voice activated device, a portable electronic device, a car, a computing device, a communication device, an internet-of-things (IoT) device, a virtual reality (VR) device, a base station, a mobile device, or any combination thereof.

In conjunction with the described implementations, an apparatus includes means for identifying audio segments of audio data corresponding to audio events. For example, the means for identifying audio segments can correspond to the audio scene segmentor 102, the audio scene graph generator 140, the system 100 of FIG. 1, the audio scene graph system 1356, the second stage 1350, the second power domain 1305, the one or more processors 1390, the device 1302, the system 1300 of FIG. 13, the integrated circuit 1402, the one or more processors 1490 of FIG. 14, the mobile device 1502 of FIG. 15, the headset device 1602 of FIG. 16, the wearable electronic device 1702 of FIG. 17, the one or more processors 1890, the wireless speaker and voice activated device 1802 of FIG. 18, the camera device 1902 of FIG. 19, the headset 2002 of FIG. 20, the vehicle 2102 of FIG. 21, the vehicle 2202 of FIG. 22, the processor 2406, the processors 2410, the device 2400 of FIG. 24, one or more other circuits or components configured to identify audio segments of audio data corresponding to audio events, or any combination thereof.

The apparatus also includes means for assigning tags to the audio segments, a tag of a particular audio segment describing a corresponding audio event. For example, the means for assigning tags can correspond to the audio scene segmentor 102, the audio scene graph generator 140, the system 100 of FIG. 1, the audio scene graph system 1356, the second stage 1350, the second power domain 1305, the one or more processors 1390, the device 1302, the system 1300 of FIG. 13, the integrated circuit 1402, the one or more processors 1490 of FIG. 14, the mobile device 1502 of FIG. 15, the headset device 1602 of FIG. 16, the wearable electronic device 1702 of FIG. 17, the one or more processors 1890, the wireless speaker and voice activated device 1802 of FIG. 18, the camera device 1902 of FIG. 19, the headset 2002 of FIG. 20, the vehicle 2102 of FIG. 21, the vehicle 2202 of FIG. 22, the processor 2406, the processors 2410, the device 2400 of FIG. 24, one or more other circuits or components configured to assign tags to the audio segments, or any combination thereof.

The apparatus further includes means for determining, based on knowledge data, relations between the audio events. For example, the means for determining relations can correspond to the knowledge data analyzer 108, the audio scene graph generator 140, the system 100 of FIG. 1, the audio scene graph system 1356, the second stage 1350, the second power domain 1305, the one or more processors 1390, the device 1302, the system 1300 of FIG. 13, the integrated circuit 1402, the one or more processors 1490 of FIG. 14, the mobile device 1502 of FIG. 15, the headset device 1602 of FIG. 16, the wearable electronic device 1702 of FIG. 17, the one or more processors 1890, the wireless speaker and voice activated device 1802 of FIG. 18, the camera device 1902 of FIG. 19, the headset 2002 of FIG. 20, the vehicle 2102 of FIG. 21, the vehicle 2202 of FIG. 22, the processor 2406, the processors 2410, the device 2400 of FIG. 24, one or more other circuits or components configured to determine relations between the audio events, or any combination thereof.

The apparatus also includes means for constructing an audio scene graph based on a temporal order of the audio events. For example, the means for identifying audio segments can correspond to the audio scene graph constructor 104, the audio scene graph generator 140, the system 100 of FIG. 1, the audio scene graph system 1356, the second stage 1350, the second power domain 1305, the one or more processors 1390, the device 1302, the system 1300 of FIG. 13, the integrated circuit 1402, the one or more processors 1490 of FIG. 14, the mobile device 1502 of FIG. 15, the headset device 1602 of FIG. 16, the wearable electronic device 1702 of FIG. 17, the one or more processors 1890, the wireless speaker and voice activated device 1802 of FIG. 18, the camera device 1902 of FIG. 19, the headset 2002 of FIG. 20, the vehicle 2102 of FIG. 21, the vehicle 2202 of FIG. 22, the processor 2406, the processors 2410, the device 2400 of FIG. 24, one or more other circuits or components configured to construct an audio scene graph based on a temporal order of the audio events, or any combination thereof.

The apparatus further includes means for assigning edge weights to the audio scene graph based on a similarity metric and the relations between the audio events. For example, the means for assigning edge weights can correspond to the audio scene graph updater 118, the audio scene graph generator 140, the system 100 of FIG. 1, the audio scene graph system 1356, the second stage 1350, the second power domain 1305, the one or more processors 1390, the device 1302, the system 1300 of FIG. 13, the integrated circuit 1402, the one or more processors 1490 of FIG. 14, the mobile device 1502 of FIG. 15, the headset device 1602 of FIG. 16, the wearable electronic device 1702 of FIG. 17, the one or more processors 1890, the wireless speaker and voice activated device 1802 of FIG. 18, the camera device 1902 of FIG. 19, the headset 2002 of FIG. 20, the vehicle 2102 of FIG. 21, the vehicle 2202 of FIG. 22, the processor 2406, the processors 2410, the device 2400 of FIG. 24, one or more other circuits or components configured to assign edge weights to the audio scene graph based on a similarity metric and the relations between the audio events, or any combination thereof.

In some implementations, a non-transitory computer-readable medium (e.g., a computer-readable storage device, such as the memory 2486) includes instructions (e.g., the instructions 2456) that, when executed by one or more processors (e.g., the one or more processors 2410 or the processor 2406), cause the one or more processors to identify audio segments (e.g., the audio segments 112) of audio data (e.g., the audio data 110) corresponding to audio events. The instructions further cause the one or more processors to assign tags (e.g., the event tags 114) to the audio segments. A tag of a particular audio segment describes a corresponding audio event. The instructions also cause the one or more processors to determine, based on knowledge data (e.g., the knowledge data 122), relations (e.g., indicated by the event pair relation data 152) between the audio events. The instructions further cause the one or more processors to construct an audio scene graph (e.g., the audio scene graph 162) based on a temporal order (e.g., the audio segment temporal order 164) of the audio events. The instructions also cause the one or more processors to assign edge weights (e.g., the edge weights 526) to the audio scene graph based on a similarity metric (e.g., the overall edge weight 528) and the relations between the audio events.

Particular aspects of the disclosure are described below in sets of interrelated Examples:

According to Example 1, a device includes: a memory configured to store knowledge data; and one or more processors coupled to the memory and configured to: identify audio segments of audio data corresponding to audio events; assign tags to the audio segments, a tag of a particular audio segment describing a corresponding audio event; determine, based on the knowledge data, relations between the audio events; construct an audio scene graph based on a temporal order of the audio events; and assign edge weights to the audio scene graph based on a similarity metric and the relations between the audio events.

Example 2 includes the device of Example 1, wherein the one or more processors are further configured to: generate a first event representation of a first audio event of the audio events, wherein the audio scene graph is constructed to include a first node corresponding to the first audio event; generate a second event representation of a second audio event of the audio events, wherein the audio scene graph is constructed to include a second node corresponding to the second audio event; and based on determining that the knowledge data indicates at least a first relation between the first audio event and the second audio event, assign a first edge weight to a first edge between the first node and the second node, wherein the first edge weight is based on a first similarity metric associated with the first event representation and the second event representation.

Example 3 includes the device of Example 1 or Example 2, wherein the one or more processors are further configured to: determine a first audio embedding of a first audio segment of the audio segments, the first audio segment corresponding to the first audio event; and determine a first text embedding of a first tag of the tags, the first tag assigned to the first audio segment, wherein the first event representation is based on the first audio embedding and the first text embedding.

Example 4 includes the device of Example 3, wherein the one or more processors are configured to generate the first event representation based on a concatenation of the first audio embedding and the first text embedding.

Example 5 includes the device of any of Examples 2 to 4, wherein the one or more processors are configured to determine the first similarity metric based on a cosine similarity between the first event representation and the second event representation.

Example 6 includes the device of any of Examples 2 to 5, wherein the one or more processors are further configured to, based on determining that the knowledge data indicates multiple relations between the first audio event and the second audio event, determine the first edge weight further based on relation similarity metrics of the multiple relations.

Example 7 includes the device of any of Examples 2 to 6, wherein the one or more processors are further configured to, based on determining that the knowledge data indicates multiple relations between the first audio event and the second audio event: generate an event pair text embedding of the first audio event and the second audio event, wherein the event pair text embedding is based on a first text embedding of a first tag and a second text embedding of a second tag, wherein the first tag is assigned to a first audio segment that corresponds to the first audio event, and wherein the second tag is assigned to a second audio segment that corresponds to the second audio event; generate relation text embeddings of the multiple relations; generate relation similarity metrics based on the event pair text embedding and the relation text embeddings; and determine the first edge weight further based on the relation similarity metrics.

Example 8 includes the device of Example 7, wherein the one or more processors are configured to determine a first relation similarity metric of the first relation based on the event pair text embedding and a first relation text embedding of the first relation, wherein the first edge weight is based on a ratio of the first relation similarity metric and a sum of the relation similarity metrics.

Example 9 includes the device of Example 8, wherein the one or more processors are configured to determine the first relation similarity metric based on a cosine similarity between the event pair text embedding and the first relation text embedding.

Example 10 includes the device of any of Examples 1 to 9, wherein the one or more processors are further configured to encode the audio scene graph to generate an encoded graph, and use the encoded graph to perform one or more downstream tasks.

Example 11 includes the device of any of Examples 1 to 10, wherein the one or more processors are configured to update the audio scene graph based on user input, video data, or both.

Example 12 includes the device of any of Examples 1 to 11, wherein the one or more processors are configured to generate a graphical user interface (GUI) including a representation of the audio scene graph; provide the GUI to a display device; receive a user input; and update the audio scene graph based on the user input.

Example 13 includes the device of any of Examples 1 to 12, wherein the one or more processors are configured to detect visual relations in video data, the video data associated with the audio data; and update the audio scene graph based on the visual relations.

Example 14 includes the device of Example 13 and further includes a camera configured to generate the video data.

Example 15 includes the device of any of Examples 1 to 14, wherein the one or more processors are further configured to update the knowledge data responsive to an update of the audio scene graph.

Example 16 includes the device of any of Examples 1 to 15, wherein the one or more processors are further configured to update the similarity metric responsive to an update of the audio scene graph.

Example 17 includes the device of any of Examples 1 to 16 and further includes a microphone configured to generate the audio data.

According to Example 18, a method includes: receiving audio data at a first device; identifying, at the first device, audio segments of the audio data that correspond to audio events; assigning, at the first device, tags to the audio segments, a tag of a particular audio segment describing a corresponding audio event; determining, based on knowledge data, relations between the audio events; constructing, at the first device, an audio scene graph based on a temporal order of the audio events; assigning, at the first device, edge weights to the audio scene graph based on a similarity metric and the relations between the audio events; and providing a representation of the audio scene graph to a second device.

Example 19 includes the method of Example 18, and further includes: generating a first event representation of a first audio event of the audio events, wherein the audio scene graph is constructed to include a first node corresponding to the first audio event; generating a second event representation of a second audio event of the audio events, wherein the audio scene graph is constructed to include a second node corresponding to the second audio event; and based on determining that the knowledge data indicates at least a first relation between the first audio event and the second audio event, determining a first edge weight based on a first similarity metric associated with the first event representation and the second event representation, wherein the first edge weight is assigned to a first edge between the first node and the second node.

Example 20 includes the method of Example 18 or Example 19, and further includes: determining a first audio embedding of a first audio segment of the audio segments, the first audio segment corresponding to the first audio event; and determining a first text embedding of a first tag of the tags, the first tag assigned to the first audio segment, wherein the first event representation is based on the first audio embedding and the first text embedding.

Example 21 includes the method of Example 20, wherein the first event representation is based on a concatenation of the first audio embedding and the first text embedding.

Example 22 includes the method of any of Examples 19 to 21, wherein the first similarity metric is based on a cosine similarity between the first event representation and the second event representation.

Example 23 includes the method of any of Examples 19 to 22 and further includes, based on determining that the knowledge data indicates multiple relations between the first audio event and the second audio event, determining the first edge weight further based on relation similarity metrics of the multiple relations.

Example 24 includes the method of any of Examples 19 to 23 and further includes, based on determining that the knowledge data indicates multiple relations between the first audio event and the second audio event: generating an event pair text embedding of the first audio event and the second audio event, wherein the event pair text embedding is based on a first text embedding of a first tag and a second text embedding of a second tag, wherein the first tag is assigned to a first audio segment that corresponds to the first audio event, and wherein the second tag is assigned to a second audio segment that corresponds to the second audio event; generating relation text embeddings of the multiple relations; generating relation similarity metrics based on the event pair text embedding and the relation text embeddings; and determining the first edge weight further based on the relation similarity metrics.

Example 25 includes the method of Example 24 and further includes determining a first relation similarity metric of the first relation based on the event pair text embedding and a first relation text embedding of the first relation, wherein the first edge weight is based on a ratio of the first relation similarity metric and a sum of the relation similarity metrics.

Example 26 includes the method of Example 25, wherein the first relation similarity metric is based on a cosine similarity between the event pair text embedding and the first relation text embedding.

Example 27 includes the method of any of Examples 18 to 26, and further includes: encoding the audio scene graph to generate an encoded graph, and using the encoded graph to perform one or more downstream tasks.

Example 28 includes the method of any of Examples 18 to 27, and further includes updating the audio scene graph based on user input, video data, or both.

Example 29 includes the method of any of Examples 18 to 28, and further includes: generating a graphical user interface (GUI) including a representation of the audio scene graph; providing the GUI to a display device; receiving a user input; and updating the audio scene graph based on the user input.

Example 30 includes the method of any of Examples 18 to 29, and further includes: detecting visual relations in video data, the video data associated with the audio data; and updating the audio scene graph based on the visual relations.

Example 31 includes the method of Example 30 and further includes receiving the video data from a camera.

Example 32 includes the method of any of Examples 18 to 31, and further includes updating the knowledge data responsive to an update of the audio scene graph.

Example 33 includes the method of any of Examples 18 to 32, and further includes updating the similarity metric responsive to an update of the audio scene graph.

Example 34 includes the method of any of Examples 18 to 33 and further includes receiving the audio data from a microphone.

According to Example 35, a device includes: a memory configured to store instructions; and a processor configured to execute the instructions to perform the method of any of Example 18 to 34.

According to Example 36, a non-transitory computer-readable medium stores instructions that, when executed by a processor, cause the processor to perform the method of any of Example 18 to Example 34.

According to Example 37, an apparatus includes means for carrying out the method of any of Example 18 to Example 34.

According to Example 38, a non-transitory computer-readable medium storing instructions that, when executed by one or more processors, cause the one or more processors to: identify audio segments of audio data corresponding to audio events; assign tags to the audio segments, a tag of a particular audio segment describing a corresponding audio event; determine, based on knowledge data, relations between the audio events; construct an audio scene graph based on a temporal order of the audio events; and assign edge weights to the audio scene graph based on a similarity metric and the relations between the audio events.

Example 39 includes the non-transitory computer-readable medium of Example 38, wherein the instructions, when executed by the one or more processors, also cause the one or more processors to: encode the audio scene graph to generate an encoded graph, and use the encoded graph to perform one or more downstream tasks.

According to Example 40, an apparatus includes: means for identifying audio segments of audio data corresponding to audio events; means for assigning tags to the audio segments, a tag of a particular audio segment describing a corresponding audio event; means for determining, based on knowledge data, relations between the audio events; means for constructing an audio scene graph based on a temporal order of the audio events; and means for assigning edge weights to the audio scene graph based on a similarity metric and the relations between the audio events.

Example 41 includes the apparatus of Example 40, wherein at least one of the means for identifying the audio segments, the means for assigning the tags, the means for determining the relations, the means for constructing the audio scene graph, and the means for assigning the edge weights are integrated into at least one of a computer, a mobile phone, a communication device, a vehicle, a headset, or an extended reality (XR) device.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A device comprising:

a memory configured to store knowledge data; and one or more processors coupled to the memory and configured to:

obtain a first audio embedding of a first audio segment of audio data, the first audio segment corresponding to a first audio event of audio events;

obtain a first text embedding of a first tag assigned to the first audio segment;

obtain a first event representation of the first audio event, the first event representation based on a combination of the first audio embedding and the first text embedding;

obtain a second event representation of a second audio event of the audio events, wherein the second audio event is a different type of audio event than the first audio event;

determine, based on the knowledge data, relations between the audio events; and construct an audio scene graph based on a temporal order of the audio events, the audio scene graph constructed to include a first node corresponding to the first audio event and a second node corresponding to the second audio event.

2. The device of claim 1, wherein the one or more processors are configured to:

obtain audio segments of audio data identified as corresponding to the audio events, the audio segments including the first audio segment and a second audio segment, wherein the second audio segment corresponds to the second audio event; and obtain tags assigned to the audio segments, a tag of a particular audio segment describing a corresponding audio event, wherein the tags include the first tag.

3. The device of claim 1, wherein the one or more processors are configured to obtain edge weights assigned to the audio scene graph based on a similarity metric and the relations between the audio events.

4. The device of claim 1, wherein the one or more processors are configured to, based on a determination that the knowledge data indicates at least a first relation between the first audio event and the second audio event, assign a first edge weight to a first edge between the first node and the second node, wherein the first edge weight is based on a first similarity metric associated with the first event representation and the second event representation.

5. The device of claim 4, wherein the one or more processors are configured to determine the first similarity metric based on a cosine similarity between the first event representation and the second event representation.

6. The device of claim 4, wherein the one or more processors are configured to, based on determining that the knowledge data indicates multiple relations between the first audio event and the second audio event, determine the first edge weight further based on relation similarity metrics of the multiple relations.

7. The device of claim 4, wherein the one or more processors are configured to, based on determining that the knowledge data indicates multiple relations between the first audio event and the second audio event:

generate an event pair text embedding of the first audio event and the second audio event, wherein the event pair text embedding is based on the first text embedding and a second text embedding of a second tag, wherein the second tag is assigned to a second audio segment that corresponds to the second audio event;

generate relation text embeddings of the multiple relations;

generate relation similarity metrics based on the event pair text embedding and the relation text embeddings; and determine the first edge weight further based on the relation similarity metrics.

8. The device of claim 7, wherein the one or more processors are configured to determine a first relation similarity metric of the first relation based on the event pair text embedding and a first relation text embedding of the first relation, wherein the first edge weight is based on a ratio of the first relation similarity metric and a sum of the relation similarity metrics.

9. The device of claim 8, wherein the one or more processors are configured to determine the first relation similarity metric based on a cosine similarity between the event pair text embedding and the first relation text embedding.

10. The device of claim 4, wherein the one or more processors are configured to update the first similarity metric responsive to an update of the audio scene graph.

11. The device of claim 1, wherein the one or more processors are configured to encode the audio scene graph to generate an encoded graph, and use the encoded graph to perform one or more downstream tasks.

12. The device of claim 1, wherein the one or more processors are configured to update the audio scene graph based on user input, video data, or both.

13. The device of claim 1, wherein the one or more processors are configured to:

generate a graphical user interface (GUI) including a representation of the audio scene graph;

provide the GUI to a display device;

receive a user input; and update the audio scene graph based on the user input.

14. The device of claim 1, wherein the one or more processors are configured to:

detect visual relations in video data, the video data associated with the audio data; and update the audio scene graph based on the visual relations.

15. The device of claim 14, further comprising a camera configured to generate the video data.

16. The device of claim 1, wherein the relations include a causal relation between the first audio event and the second audio event.

17. The device of claim 1, further comprising a microphone configured to generate the audio data.

18. A method comprising:

obtaining, at a first device, a first audio embedding of a first audio segment of audio data, the first audio segment corresponding to a first audio event of audio events;

obtaining, at the first device, a first text embedding of a first tag assigned to the first audio segment;

obtaining, at the first device, a first event representation of the first audio event, the first event representation based on a combination of the first audio embedding and the first text embedding;

obtaining, at the first device, a second event representation of a second audio event of the audio events, wherein the second audio event is a different type of audio event than the first audio event;

determining, based on knowledge data, relations between the audio events;

constructing, at the first device, an audio scene graph based on a temporal order of the audio events, the audio scene graph constructed to include a first node corresponding to the first audio event and a second node corresponding to the second audio event; and providing a representation of the audio scene graph to a second device.

19. The method of claim 18, further comprising, based on determining that the knowledge data indicates at least a first relation between the first audio event and the second audio event, determining a first edge weight based on a first similarity metric associated with the first event representation and the second event representation, wherein the first edge weight is assigned to a first edge between the first node and the second node.

20. A non-transitory computer-readable medium storing instructions that, when executed by one or more processors, cause the one or more processors to:

obtain a first audio embedding of a first audio segment of audio data, the first audio segment corresponding to a first audio event of audio events;

obtain a first text embedding of a first tag assigned to the first audio segment;

obtain a first event representation of the first audio event, the first event representation based on a combination of the first audio embedding and the first text embedding;

obtain a second event representation of a second audio event of the audio events, wherein the second audio event is a different type of audio event than the first audio event;

determine, based on knowledge data, relations between the audio events; and construct an audio scene graph based on a temporal order of the audio events, the audio scene graph constructed to include a first node corresponding to the first audio event and a second node corresponding to the second audio event.

* * * * *